United States Patent
Thomas et al.

(10) Patent No.: US 8,755,133 B2
(45) Date of Patent: *Jun. 17, 2014

(54) OPTICAL ADJUSTABLE MOUNTS WITH ABSOLUTE POSITION FEEDBACK

(71) Applicant: Newport Corporation, Irvine, CA (US)

(72) Inventors: Patrick J. Thomas, Fay aux Loges (FR); Daniel Gvero, Chateauuneuf sur Loire (FR); Roger Desailly, Vitry aux Loges (FR)

(73) Assignee: Newport Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,182

(22) Filed: Jun. 10, 2013

(65) Prior Publication Data

US 2013/0271855 A1   Oct. 17, 2013

Related U.S. Application Data

(63) Continuation of application No. 13/181,444, filed on Jul. 12, 2011, now Pat. No. 8,482,868.

(60) Provisional application No. 61/364,779, filed on Jul. 15, 2010.

(51) Int. Cl.
*G02B 15/14* (2006.01)
*G02B 7/02* (2006.01)

(52) U.S. Cl.
USPC ............................................. 359/811; 359/694

(58) Field of Classification Search
USPC .................. 359/694–704, 811–830
See application file for complete search history.

(56) References Cited

U.S. PATENT DOCUMENTS

| | | |
|---|---|---|
| 3,320,580 A | 5/1967 | Sykes |
| 3,902,085 A | 8/1975 | Bizzigotti |
| 4,019,073 A | 4/1977 | Vishnevsky et al. |
| 4,453,103 A | 6/1984 | Vishnevsky et al. |
| 4,525,852 A | 6/1985 | Rosenberg |
| 4,594,584 A | 6/1986 | Pfeiffer et al. |
| 4,607,166 A | 8/1986 | Tamaki |
| 4,613,782 A | 9/1986 | Mori et al. |
| 4,622,483 A | 11/1986 | Staufenberg, Jr. et al. |
| 4,647,808 A | 3/1987 | Shibuya |
| 4,714,855 A | 12/1987 | Fujimoto |
| 4,727,278 A | 2/1988 | Staufenberg, Jr. et al. |

(Continued)

FOREIGN PATENT DOCUMENTS

| | | |
|---|---|---|
| WO | WO 2008/087469 | 7/2008 |
| WO | WO 2012/009379 | 1/2012 |

OTHER PUBLICATIONS

Agrait, Vertical Inertial Piezoelectric translation device for a scanning tunneling microscope, Rev. Sci. Instrum., Jan. 1992; 63(1):263-264.

(Continued)

*Primary Examiner* — Mohammed Hasan
(74) *Attorney, Agent, or Firm* — Anderson IP, Inc.

(57) ABSTRACT

Adjustable mounts for optical elements or the like that may include absolute position information feedback. For some embodiments, position data may be generated independent of displacement measurement. Position data feedback may be provided to driver embodiments, such as piezoelectric inertia drivers, by a controller and used to achieve a desired position setting for an adjustable mount.

11 Claims, 16 Drawing Sheets

(56) References Cited

U.S. PATENT DOCUMENTS

| | | | |
|---|---|---|---|
| 4,775,815 A | 10/1988 | Heinz | |
| 4,831,306 A | 5/1989 | Staufenberg, Jr et al. | |
| 4,857,793 A | 8/1989 | Okuno | |
| 4,918,351 A | 4/1990 | Kawai | |
| 4,933,590 A | 6/1990 | Inoue et al. | |
| 4,975,615 A | 12/1990 | Katahara | |
| 5,017,820 A | 5/1991 | Culp | |
| 5,027,028 A | 6/1991 | Skipper | |
| 5,034,647 A | 7/1991 | Ohtsuka | |
| 5,059,850 A | 10/1991 | Yoshimura et al. | |
| 5,079,471 A | 1/1992 | Nygren, Jr. | |
| 5,140,470 A | 8/1992 | Luecke | |
| 5,394,049 A | 2/1995 | Luecke et al. | |
| 5,410,206 A | 4/1995 | Luecke et al. | |
| 5,543,670 A | 8/1996 | Luecke | |
| 6,232,700 B1 | 5/2001 | Kosaka et al. | |
| 7,119,478 B1 | 10/2006 | Mentesana | |
| 8,482,868 B2 * | 7/2013 | Thomas et al. | 359/811 |
| 2003/0059194 A1 | 3/2003 | Trzechieski | |
| 2004/0124744 A1 | 7/2004 | Pease et al. | |
| 2004/0124747 A1 | 7/2004 | Bugel et al. | |
| 2006/0169837 A1 | 8/2006 | Bird et al. | |
| 2009/0127974 A1 * | 5/2009 | Piotr et al. | 310/317 |
| 2010/0118421 A1 | 5/2010 | Woodard et al. | |
| 2010/0290138 A1 * | 11/2010 | Thomas et al. | 359/824 |
| 2012/0013999 A1 | 1/2012 | Thomas et al. | |

OTHER PUBLICATIONS

Definition of Magnetostriction, printed from the internet on Oct. 9, 2006 located at: http://en.wikipedia.org/wiki/Magnetostriction.

Definition of Piezoelectricity, printed from the internet on Oct. 9, 2006. located at: http://en.wikipedia.org/Piezoelectricity.

Howald et al, Piezoelectric Inertial Stepping Motor and Spherical Rotor, Rev. Sci. Instrum., 63(8):3909-3912 1992.

Magnetostriction and Magnetostrictive materials, Printed from the internet on Oct. 9, 2006, located at: http://aml.seas.ucla.edu/research/areas/magnetostrictive/mag-composites/Magnetostriction%20and%20Magnetostrictive%20Materials.

Skipper, Piezoelectric Traction Motor Delivers High Torque, High Power at Low Speed, PCIM Jun. 1992 36-40.

International Search Report and Written Opinion mailed on: Aug. 20, 2008 in International Application No. PCT/IB2007/00602 filed on Jan. 18, 2007 and published as WO 08/087469 on Jul. 24, 2008.

International Preliminary Report on Patentability mailed on: Jul. 30, 2009 in International Application No. PCT/IB2007/00602 filed on Jan. 18, 2007 and published as WO 08/087469 on Jul. 24, 2008.

International Preliminary Report on Patentability mailed on: Jan. 15, 2013 9, 2012 in International Application No. PCT/US2011/043754 filed on Jun. 12, 2011 and published as WO 12/009379 on Jan. 19, 2012.

International Search Report and Written Opinion mailed on: Feb. 9, 2012 in International Application No. PCT/US2011/043754 filed on Jun. 12, 2011 and published as WO 12/009379 on Jan. 19, 2012.

Office Action dated: Jan. 14, 2013 in U.S. Appl. No. 12/065,083, filed Aug. 2, 2010 and published as: 2010/0290138 on: Nov. 18, 2010.

Office Action dated: Jun. 7, 2012 in U.S. Appl. No. 12/065,083, filed Aug. 2, 2010 and published as: 2010/0290138 on: Nov. 18, 2010.

Office Action dated: Mar. 25, 2013 in U.S. Appl. No. 13/181,444, filed: Jul. 12, 2011 and published as: 2012/00133999 on: Jan. 19, 2012.

Office Action dated: Oct. 24, 2012 in U.S. Appl. No. 13/181,444, filed: Jul. 12, 2011 and published as: 2012/00133999 on: Jan. 19, 2012.

* cited by examiner

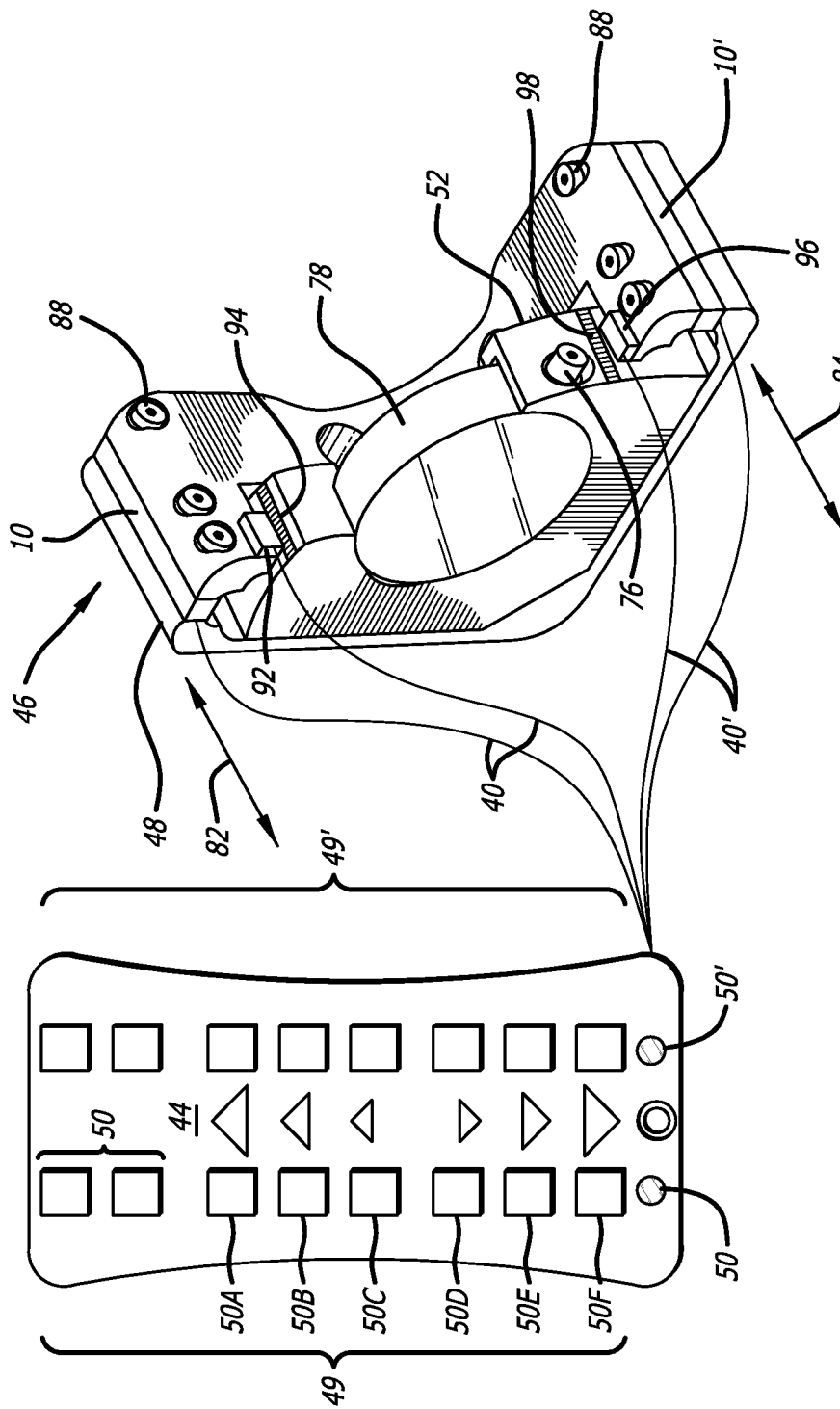

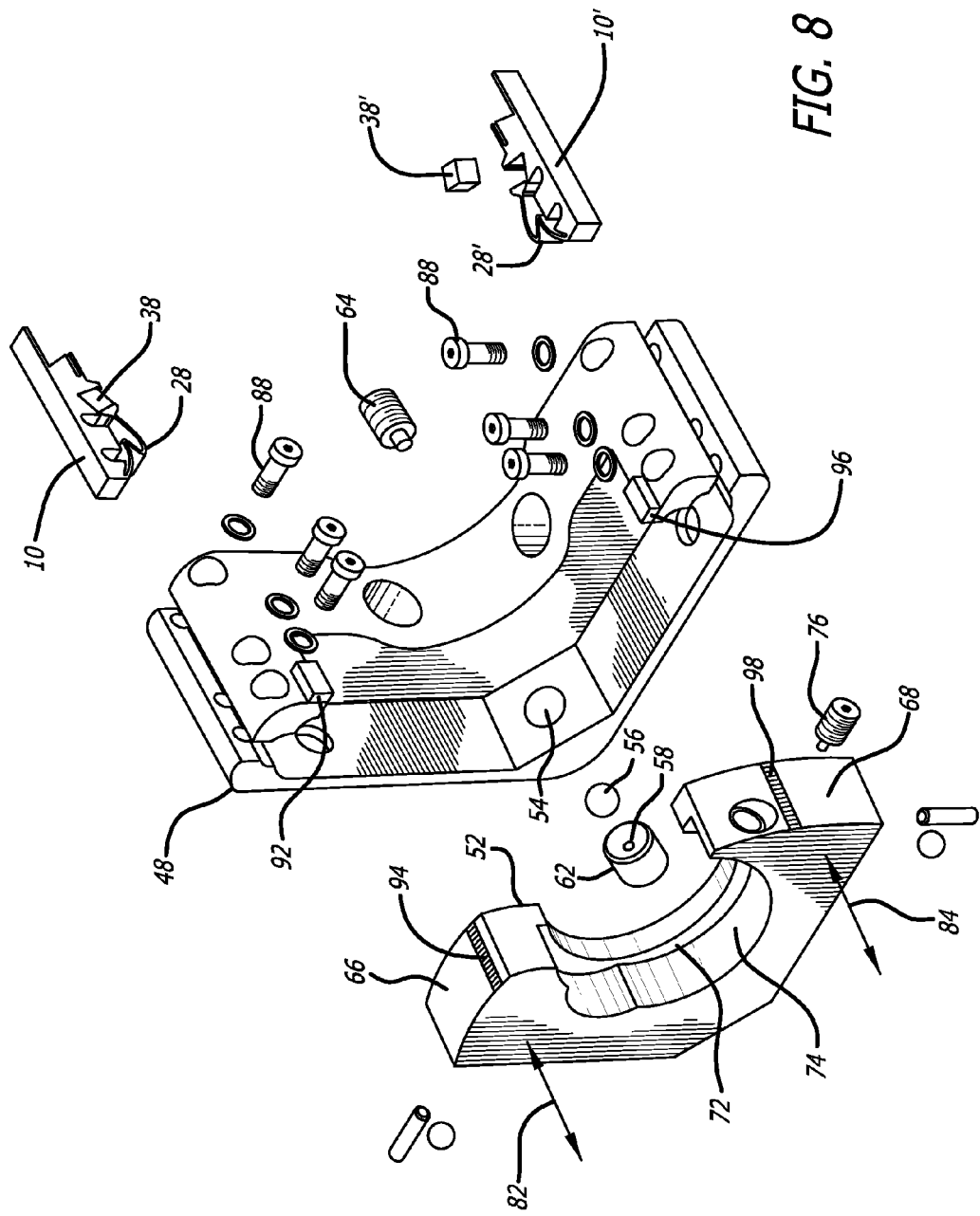

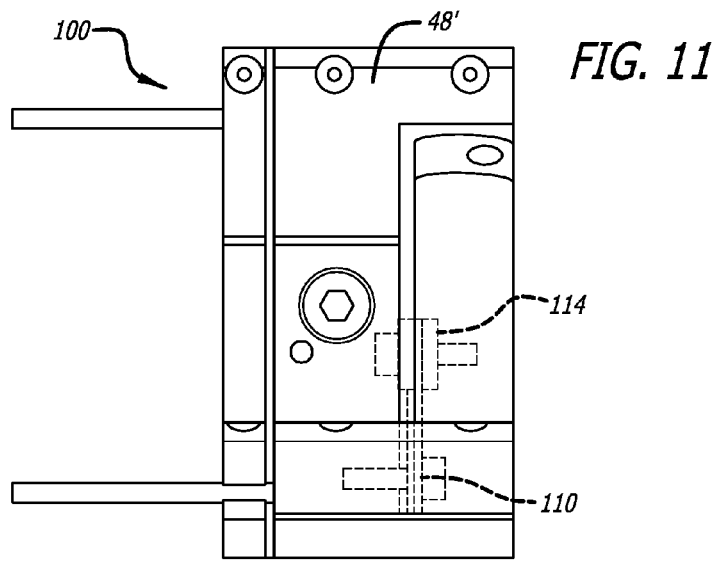
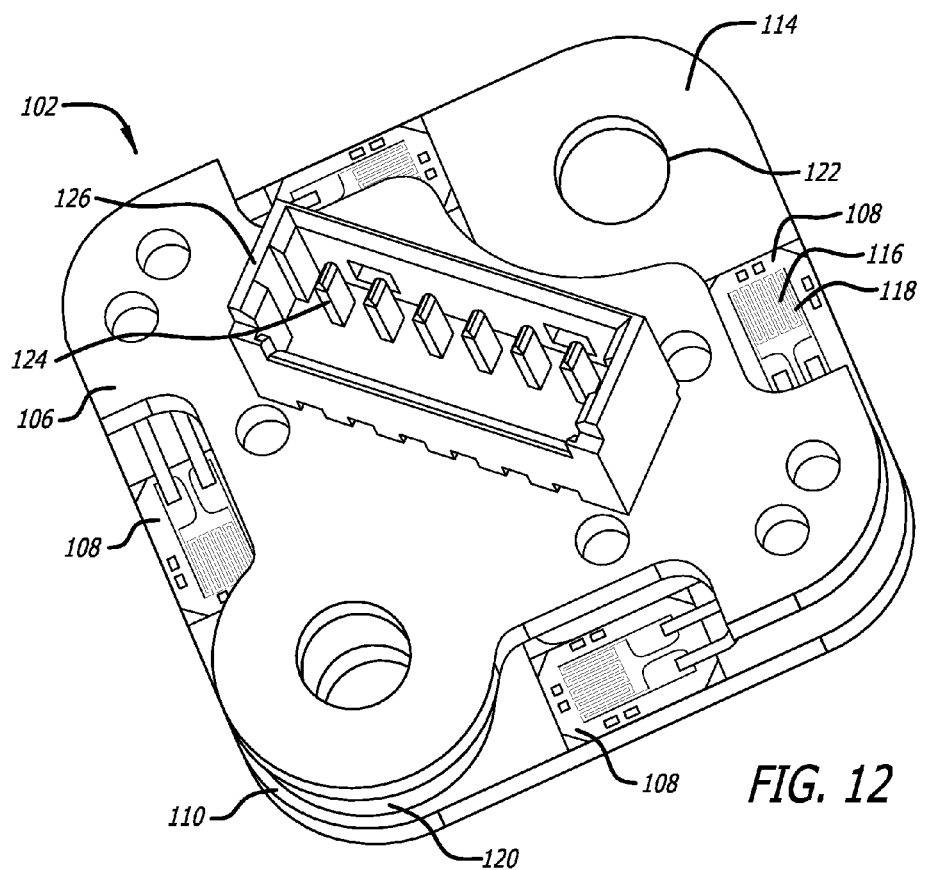

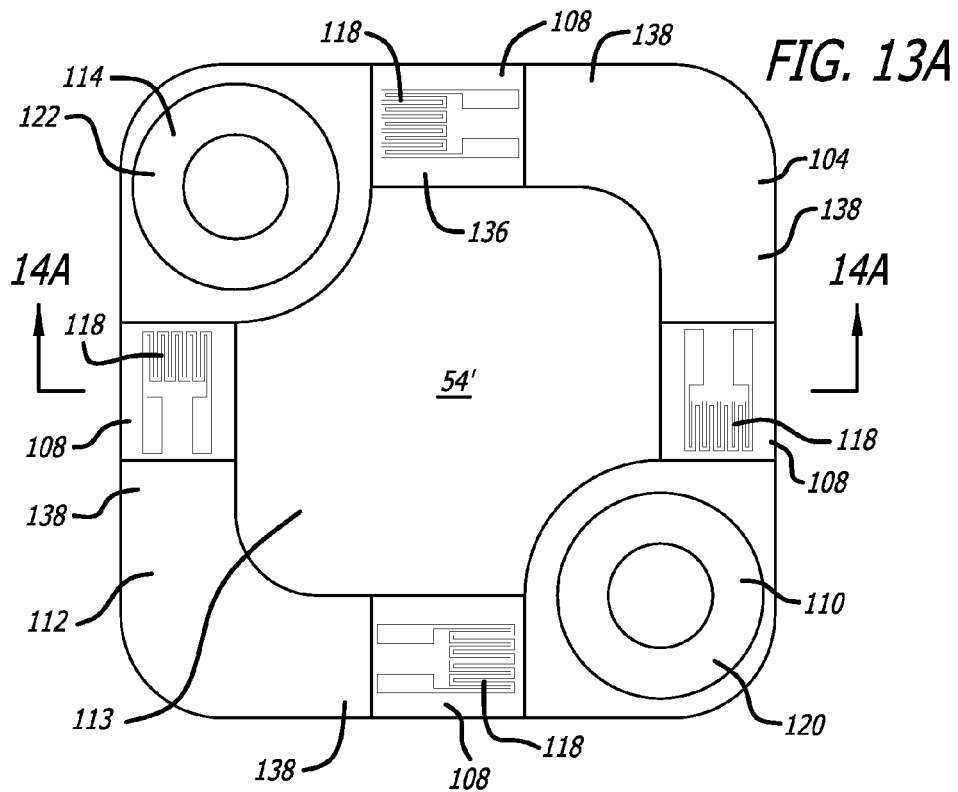
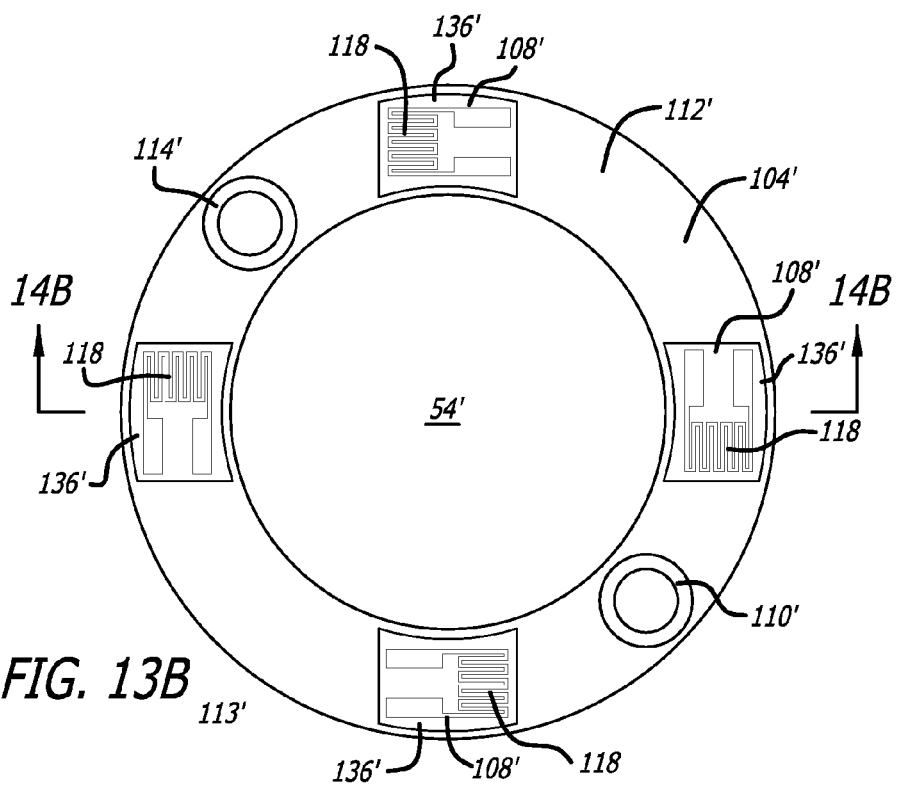

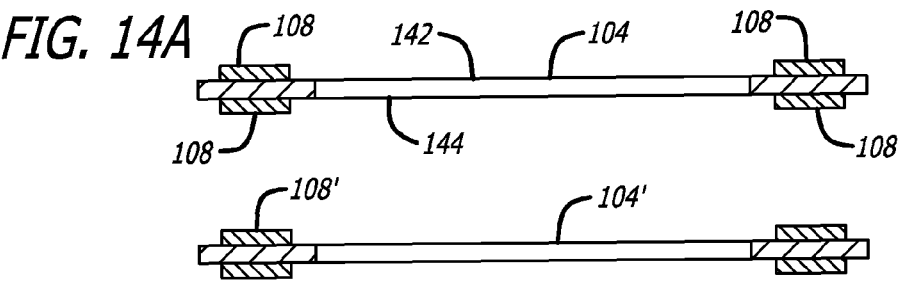
FIG. 14A
FIG. 14B
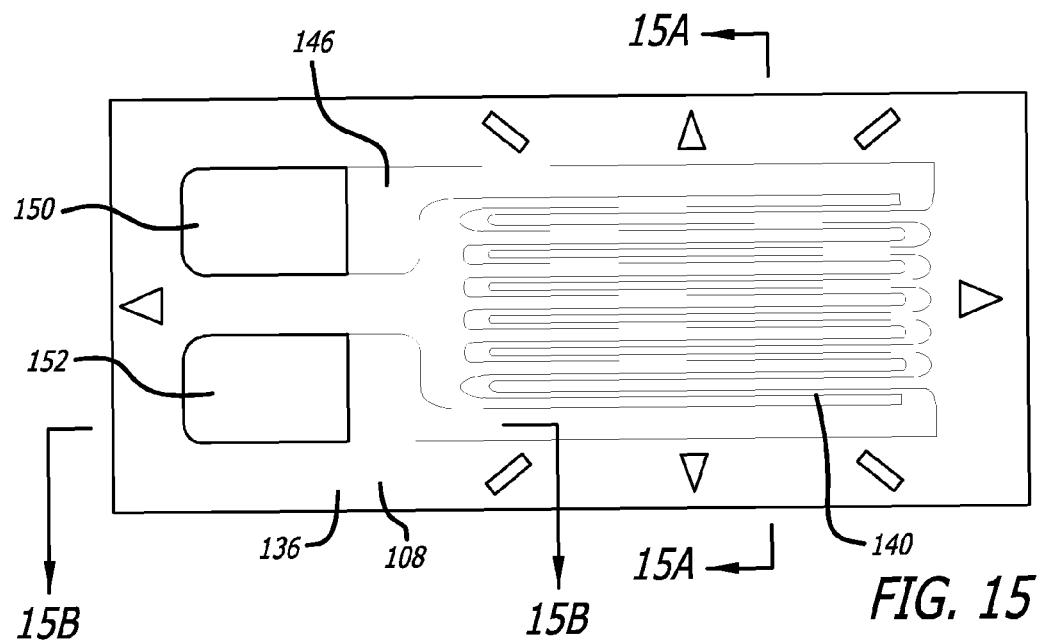
FIG. 15
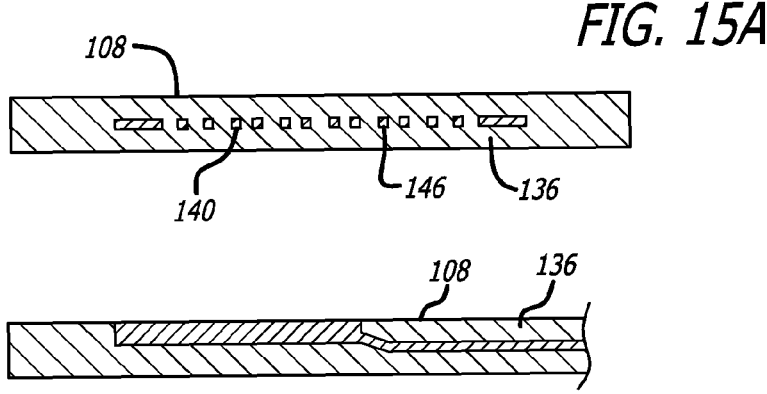
FIG. 15A
FIG. 15B

OPTICAL ADJUSTABLE MOUNTS WITH ABSOLUTE POSITION FEEDBACK

RELATED PATENT APPLICATION(S)

This application is a continuation application of U.S. patent application Ser. No. 13/181,444, filed Jul. 12, 2011, Now U.S. Pat. No. 8,482,868 B2 by P. Thomas et al., and titled Optical Adjustable Mounts with Absolute Position Feedback, which claims priority under 35 U.S.C. section 119(e) from U.S. Provisional Patent Application Ser. No. 61/364,779, filed Jul. 15, 2010, by P. Thomas et al., and titled Optical Adjustable Mounts with Absolute Position Feedback which are both incorporated by reference herein in their entirety. This application is also related to PCT application number PCT/IB2007/000602, filed Jan. 18, 2007, titled Optical Adjustment Mounts and Piezoelectric Inertia Driver and U.S. patent application Ser. No. 12/065,083, filed Feb. 27, 2008, titled Optical Adjustment Mounts and Piezoelectric Inertia Driver, which are both incorporated by reference herein in their entirety.

FIELD

The application is directed generally to devices and methods for accurately positioning a device, such as an optical component or the like, with position detection or measurement feedback. In some embodiments, position feedback data may be stored and used to reacquire a known position after adjustment, disturbance or any other activity that moves the device previously positioned. Position feedback data may also be analyzed in order to determine a current position of a device.

BACKGROUND

Optical devices or elements such as lenses, mirrors, wave plates, filters, volume Bragg gratings, prisms and the like are often mounted to an optical system, and particularly an experimental optical system, with an adjustable optical mount. An example of an optical system may include an optical bench or base having multiple optical devices and components mounted to the base with an orientation so as to provide an optical path which directs a light beam from one optical device to the next. Beams from lasers or other light sources are generally used for such applications. For such arrangements, an adjustable optical mount provides a mechanism to securely fasten an optical element to the optical bench or other component of the optical system and still allow for some adjustment of the orientation of the optical element.

Existing adjustable optical mounts may include embodiments having a first plate configured to have an optical element secured thereto. A second plate is disposed adjacent the first plate and includes three contact points extending from the second plate to the first plate. One or more of the contact points may be disposed on the end of an adjustment shaft, such as an adjustment screw, which is threaded to the second plate. The contact points may also be disposed in a detent on the first plate which allows rotation of the contact point relative to the first plate, but prevents the contact point from sliding or being transversely displaced along the first plate. One or more retractive members, such as springs or magnets, are fastened between the first and second plates so as to force the plates to be drawn together with the restorative force of the spring, springs, magnet or magnets. The attractive force generated by the retractive members between the plates is resisted by the three contact points against the respective detents of the first plate.

In such an arrangement, rotation of an adjustment screw moves the adjustment screw relative to the second plate in order to adjust the separation between the plates at the adjustment screw position and thus the relative orientation of the first plate to the second plate. If a fine screw thread is used for the adjustment screw, fine adjustment of the orientation of the first plate and optical element can be made with respect to the second plate. The second plate is generally configured to be securely mounted to a base of an optical system with a flange, clearance hole, threaded hole or the like. Once the second plate is securely fastened to the optical bench or base, the adjustable optical mount allows the optical element secured to the first plate to be secured to the base of the optical system with fine adjustment of the orientation of the optical element relative to an optical path of the optical system.

One of the shortcomings of such an arrangement is that the manual manipulation of one adjustment screw may disturb other adjustment screws or move the entire optical mount structure. Such systems may also be adjusted with remote electric motors, such as stepper motors; however, these types of motors tend to be bulky and expensive and may require complicated reduction gearing as well as other refinements. Another problem with some existing optical mounts is a lack of ability to reset the optical mount to a know position if it has been disturbed or inadvertently moved. As such, what has been needed are adjustable optical mounts capable of remote adjustment that enable precision control of the position of an optical element in a desired axis. What has also been needed are adjustable optical mounts having the ability to return to a known position.

SUMMARY

Some embodiments of an adjustable mount for an optical element include a first mount body and a second mount body which is configured to secure an optical element thereto and which is movable relative to the first mount body in an adjustable degree of freedom. The adjustable mount also includes a driver configured to controllably impart relative movement in the adjustable degree of freedom between the first mount body and the second mount body. A flexible substrate includes a first portion secured to the first mount body and a second portion secured to the second mount body. A strain gauge element is mechanically secured to the flexible substrate and is configured to register strain of the flexible substrate and generate a signal in response to a strain of the flexible substrate. A controller may be in operative communication with the stain gauge element and may be configured to generate position data from the strain gauge element signal.

Some embodiments of an adjustable mount for an optical element include a first mount body and a second mount body which is configured to secure an optical element thereto and which is movable relative to the first mount body in a first adjustable degree of freedom and a second adjustable degree of freedom. The adjustable mount also includes a first driver configured to controllably impart relative movement in the first adjustable degree of freedom between the first mount body and the second mount body. A second driver may be configured to controllably impart relative movement in the second adjustable degree of freedom between the first mount body and the second mount body. A flexible substrate includes a thin flexible sheet with a first portion of the flexible substrate secured to the first mount body and a second portion of the flexible substrate secured to the second mount body. A strain gauge element may be mechanically secured to the flexible substrate and may be configured to register strain of the flexible substrate and generate a signal in response to a strain of the flexible substrate. A controller may be in operative communication with the strain gauge element and may also be configured to generate position data from the strain gauge element signal.

Some embodiments of an adjustable mount for an optical element include a first mount body and a second mount body which may be configured to secure an optical element thereto and which may be movable relative to the first mount body in an adjustable degree of freedom. A flexible substrate includes a first portion secured to the first mount body and a second portion secured to the second mount body. A strain gauge element may be mechanically secured to the flexible substrate and may be configured to register strain of the flexible substrate and generate a signal in response to a strain of the flexible substrate.

Some embodiments of a method of adjusting an adjustable mount for an optical element include providing an adjustable mount for an optical element, the mount including a first mount body and a second mount body which is configured to secure an optical element thereto and which is movable relative to the first mount body in an adjustable degree of freedom. The adjustable mount also includes a flexible substrate having a first portion secured to the first mount body and a second portion secured to the second mount body. The adjustable mount also includes a strain gauge element which may be mechanically secured to the flexible substrate and configured to register strain of the flexible substrate and generate a signal in response to a strain of the flexible substrate. The adjustable mount may also include a controller in operative communication with the stain gauge element and configured to generate position data from a strain gauge element signal. The controller may then be used to generate data regarding a first absolute position of the second mount body relative to the first mount body from a strain gauge element signal.

Certain embodiments are described further in the following description, examples, claims and drawings. These features of embodiments will become more apparent from the following detailed description when taken in conjunction with the accompanying exemplary drawings.

BRIEF DESCRIPTION OF THE DRAWINGS

The drawings illustrate embodiments of the technology and are not limiting. For clarity and ease of illustration, the drawings may not be made to scale and, in some instances, various aspects may be shown exaggerated or enlarged to facilitate an understanding of particular embodiments.

FIG. 7 is a perspective view of an embodiment of an adjustable mount having a first piezoelectric inertia driver and a second piezoelectric inertia driver.

FIG. 8 is an exploded view of the adjustable mount embodiment of FIG. 7.

FIG. 11 is an elevation view of the adjustable optical mount of FIG. 9.

FIG. 12 is a perspective view of a position measurement module embodiment of the adjustable optical mount of FIG. 9 including the strain gauge assembly embodiment and a circuit board embodiment secured thereto.

FIG. 13A is a front view of the strain gauge assembly embodiment of the mount of FIG. 9.

FIG. 13B is a front view of a strain gauge assembly embodiment.

FIG. 14A is a cross section view of the strain gauge assembly of FIG. 13A taken long lines 14A-14A of FIG. 13A.

FIG. 14B is a cross section view of the strain gauge assembly of FIG. 13B taken long lines 14B-14B of FIG. 13B.

FIG. 15 is a top view of a strain gauge embodiment.

FIG. 15A is a transverse cross section of the strain gauge of FIG. 15 taken along lines 15A-15A of FIG. 15.

FIG. 15B is a transverse cross section of the strain gauge of FIG. 15 taken along lines 15B-15B of FIG. 15.

DETAILED DESCRIPTION

Embodiments discussed herein are directed to compact motorized driving mechanisms, including piezoelectric inertia drivers, for use with mounts for optical adjustment. Such mounts may be configured to have little or no angular range limitations, an availability of a central aperture through the mounts, positional stability in case of a loss of power to the mount, a good sensitivity and low cost relative to other motorized adjustable mounts for optical adjustment. Such a motorized driving mechanism in the form of a piezoelectric inertia driver may be used in a wide variety of mounts for optical adjustment, including rotary mounts such as rotation stages, optical mounts configure to adjust an angular tilt or orientation of an optic such as kinematic optical mounts that may include a pivoted or jointed configuration, and translation mounts which may include translation stages and the like. Such mounts may be particularly useful in situations that require the use of multiple optical elements that need to be regularly tuned or aligned. In addition, the ability of such mounts to retain positional stability when powered off allows a single controller to be used to adjust multiple mounts with the use of switch box, or the like, which may further decrease the cost of control electronics for an optical system. The mounts may be used to mount and adjust optical devices or elements such as lenses, mirrors, wave plates, filters, volume Bragg gratings, prisms and the like.

Figure 1:
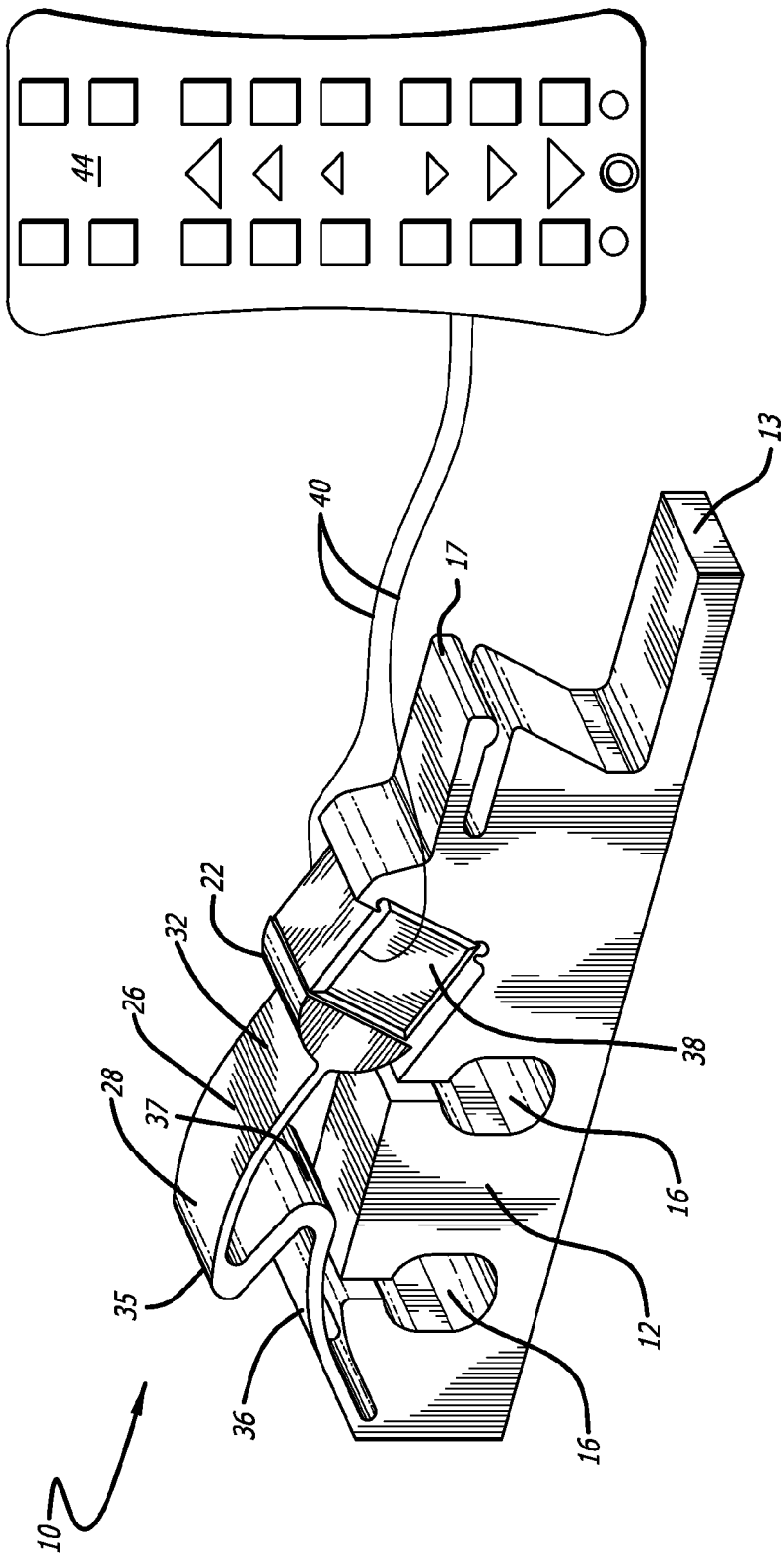
FIG. 1 is a perspective view of an embodiment of a piezoelectric inertia driver for optical adjustment.
Figure 2:
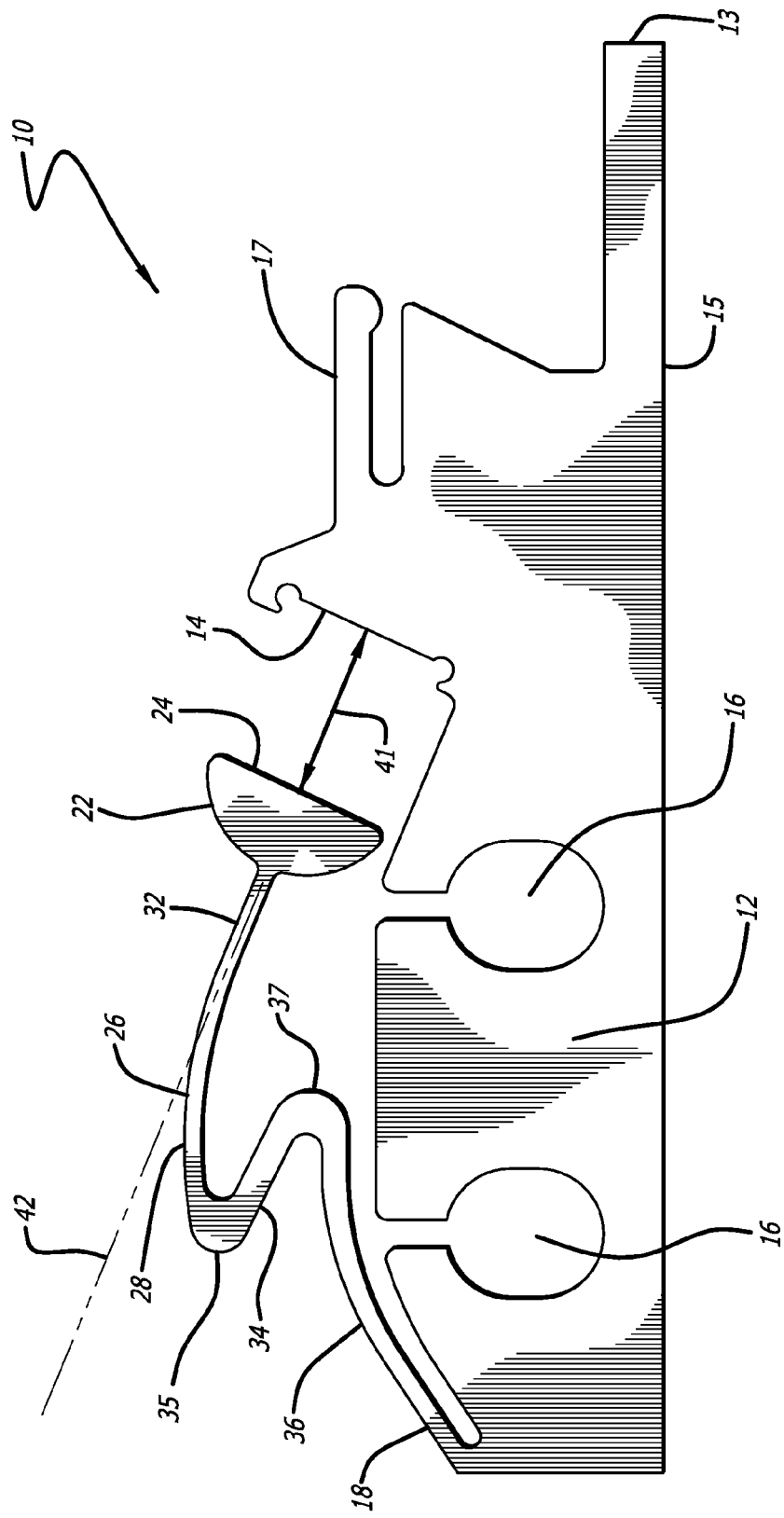
FIG. 2 is an elevation view of the piezoelectric inertia driver embodiment for optical adjustment of FIG. 1 without the piezoelectric member shown.

Referring to FIGS. 1 and 2, a piezoelectric inertia driver embodiment 10 for optical adjustment is shown. The driver 10 includes a rigid body portion 12 having a first piezoelectric member mount surface 14 disposed towards a first end 13 of the rigid body portion 12 at an angle of about 20 degrees to about 30 degrees from perpendicular with a flat bottom surface 15 of the rigid body portion 12. The rigid body portion 12 includes two mount slots 16 that may be used to secure the rigid body portion 12 to a mount or portion thereof, with suitable screws, bolts, rivets or the like. Although mounting slots 16 are shown, other suitable mounting fixtures for the rigid body portion 12 may also be used, such as mounting holes, which may or may not be threaded, grooves and the like. A wiring mount boss 17 extends adjacent the first end 13 of the rigid body portion for securing any wiring in communication with the piezoelectric inertia driver 10.

The driver 10 also includes a continuous and flexible resilient member 18 having a first end 22 which includes a second piezoelectric member mount surface 24, a drive surface portion 26 having a drive surface 28 and an axially rigid portion 32 disposed between and secured to the drive surface portion 26 and the first end 22. An S-shaped resilient portion 34 extends from the drive surface portion 26 and a second end portion 36 is disposed between and secured to the S-shaped resilient portion 34 and the rigid body portion 12. The second piezoelectric mount surface 24 is substantially parallel and disposed opposite to the first piezoelectric member mount surface 14. The resilient member 18, which has a ribbon-like configuration with a rectangular transverse cross section, extends from the first end 22 away from the first end 13 of the rigid body portion 12 in an angular orientation that is substantially perpendicular to the first and second piezoelectric mount surfaces 14 and 24. The portion of the resilient member 18 that extends from the first end 22 to the drive surface portion 26 forms the axially rigid or drive force transfer portion 32. The axially rigid portion 32 transmits drive force from the first end 22 to the drive surface 28 which is disposed on the drive surface portion 26. The drive surface 28 is the portion of the resilient member 18 that extends the furthest from the bottom surface 15 of the rigid body 12 in a direction perpendicular to the bottom surface 15. This allows the drive surface 28 to engage a surface of a body to be moved or otherwise driven by the piezoelectric actuator 10.

The driving force at the first end 22 of the resilient member 18 is generated by a piezoelectric member 38 which is disposed between and secured to the first and second piezoelectric member mount surfaces 14 and 24. In a relaxed state without the piezoelectric member 38 in place, the inner space between the first mount surface 14 and second mount surface 24, as indicated by arrow 41, may be smaller than a corresponding outer dimension of the piezoelectric member 38 to be disposed therein, for some embodiments. This configuration provides a preload compression on the piezoelectric member 38 once it is secured in place between the first and second mount surfaces 14 and 24. For some embodiments, the inner space between the first mount surface 14 and second mount surface 24, as indicated by arrow 41, may be about the same size as the corresponding outer dimension of the piezoelectric member 38. For such embodiments, axial preload compression on the piezoelectric member 38 may be generated by a compression force exerted against and substantially perpendicular to the drive surface 28.

The first and second mount surfaces 14 and 24 may be recessed so as to mechanically capture the piezoelectric member 38 in at least one transverse dimension relative to a longitudinal axis 42 of the axially rigid portion 32 of the resilient member 18 disposed between and secured to the drive surface portion 26 and the first end 22. The piezoelectric member 38 may be secured to the first and second mount surfaces 14 and 24 by mechanical capture, bonding by glues, epoxies and the like, welding, brazing, soldering or any other suitable method that will provide for both compression and tension stability of the joints along the longitudinal axis 42 of the axially rigid portion 32 of the resilient member 18. The resilient member 18 may be configured to maintain permanently a calibrated contact friction load through the drive surface 28 to an adjacent surface.

The S-shaped resilient portion 34 which extends between the drive surface portion 26 and second end portion 36 of the resilient member 18 is configured to resiliently resist and counter frictional drive force applied to the drive surface 28 of the flexible resilient member 18. In addition, the S-shaped portion 34 is also configured to cancel torque that might otherwise be imparted from the resilient member 18 to the piezoelectric body 38. In the embodiment shown, the S-shaped portion 34 bends under the drive surface portion 26 and back towards the first end 22 from a first bend 35. A second bend 37 redirects the S-shaped portion 34 back again towards the second end portion 36 and the junction between the second end portion 36 and the rigid body portion 12. The first and second bends 35 and 37 of the S-shaped portion 34 may have bend angles of about 250 degrees to about 330 degrees from a nominal longitudinal axis of the resilient member 18, for some embodiments. For some embodiments, the length of the portion of the S-shaped portion 34 between the first and second bends 35 and 37 may be about 2 mm to about 4 mm. The inside radius of curvature of the first and second bends 35 and 37 may be about 2 mm to about 4 mm for some embodiments.

In the embodiment shown, the rigid body portion 12 and flexible resilient member 18 have a monolithic structure formed from a single piece of resilient material. For some embodiments, the single piece of resilient material may be a resilient metal, such as spring steel, stainless steel or the like. Because the rigid body portion 12 and flexible resilient member 18 are made from a single piece of material, the junction between the second end portion 36 and the rigid body portion 12 is such that torque and axial forces may be transmitted between the second end portion 36 of the resilient member 18 and the rigid body portion 12. Although the resilient member 18 is shown as having a substantially ribbon-like configuration with a rectangular transverse cross section, the resilient member 18 may also have other configurations, including transverse cross sections that are square, round, oblong or the like.

Embodiments of the piezoelectric inertia driver 10 may have a length of about 10 mm to about 100 mm and a width of about 2 mm to about 10 mm. Embodiments of the resilient member 18 may have thickness of about 0.2 mm to about 1 mm. The piezoelectric member 38 for such embodiments be generally rectangular in shape and may have a length of about 1 mm to about 10 mm, a width of about 1 mm to about 10 mm and a thickness of about 1 mm to about 10 mm. Some embodiments of the piezoelectric member 38 are substantially cubic in shape, as shown. The piezoelectric element may also have other outer shape configurations such as cylindrical, hexagonal and the like. The compressive axial preload on the piezoelectric member 38 between the first and second mount surfaces 14 and 24 may be about 10 Newtons to about 50 Newtons, for some embodiments having a frictional force substantially perpendicular to the drive surface 28 of about 20 Newtons to about 60 Newtons. Such embodiments may generate an axial drive force in a direction tangent to the drive surface 28 of about 1 Newton to about 5 Newtons. The piezoelectric member 38 may include piezoelectric crystals, piezoelectric ceramics or any other suitable material that changes outer dimensions based on the application of an external field or signal such as an electrical signal.

Although the embodiments discussed herein are shown with piezoelectric members 38, it should be understood that a magnetostrictive member having similar dimensions and operating parameters as the piezoelectric member 38 may be substituted for the piezoelectric member 38 for some embodiments of an inertial driver having the same or similar materials, dimensions and operating characteristics overall as those of the piezoelectric inertial driver 10. If a variable magnetic field signal can be applied to such a magnetostrictive member so as to produce the type of ramped periodic movement discussed below with respect to FIGS. 3A-6B, the operation of such a magnetostrictive inertial driver may be substantially the same as that of the piezoelectric inertial driver 10.

A piezoelectric inertia driver system includes a controller 44 electrically coupled to the piezoelectric inertia driver 10 by conductors 40. Embodiments of the controller 44 may include a power source, a CPU, external controls for data input, a graphical display and any other electrical circuitry necessary to allow a user to program or otherwise control the actuation of the piezoelectric inertia driver 10. The driver 10 may be used to move mounts for optical adjustment, or portions thereof, by applying movement of varying velocity from the drive surface 28. When a specific voltage profile is applied by the controller 44 to the piezoelectric member 38, extensions and contractions of the piezoelectric member 38 along a direction of the longitudinal axis 42 of the axially rigid portion 32 of the flexible resilient member 18 are generated to the drive surface 28. The resulting motion profile is transferred to a desired portion of a mount so that a highly sensitive and repeatable motion can directly be achieved with reduction in size, number of parts, weight and cost.

Referring to FIGS. 3A-6B, some embodiments of various voltage signal profiles are shown. The voltage signal profiles indicate the magnitude and polarity of voltage applied to the piezoelectric member 38 versus time that may be used to generate movement of the drive surface 28. For such voltage signal profiles, a slow change in applied voltage results in a corresponding slow movement and low acceleration of the drive surface 28. Due to a spring preload of the drive surface 28 of the piezoelectric inertia driver 10 against a body, such as a mount body, a slow translation of the drive surface 28 with low acceleration may be used to generate corresponding movement in a movable mount body which is in frictional engagement with the drive surface 28. By contrast, a relatively rapid increase or decrease in voltage and high level of acceleration of the drive surface 28 will break the frictional engagement of the drive surface 28 and mount body if the moving portion of a mount has sufficient intrinsic inertia. As such, for this high acceleration, the drive surface 28 slips past the moving portion of the mount without substantial translation thereof. When a non-symmetric tension or voltage profile is applied to the piezoelectric member 38, the singular or periodic combination of quick changes in voltage and slow changes in voltage, and corresponding movement of the drive surface 28, can be used to achieve precise movement of the moving portion of a mount in both directions, with no loss of stability during a power shutdown and no range of movement limitation.

Figure 3A:
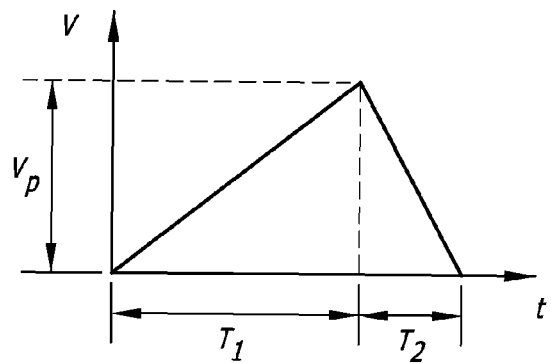
FIGS. 3A-6B are graphical representations of various voltage signals and signal pulse embodiments that may be used to drive embodiments of a piezoelectric inertia driver.

Referring to FIG. 3A, a basic driver voltage pattern or signal pulse that may be applied to the piezoelectric member 38 is shown having a voltage that ramps up relatively slowly to a peak voltage indicated by arrow $V_P$ over time period $T_1$. This slow ramping up of the voltage signal may be used to generate movement in a mount body that may correspond to the total change in voltage during the slow ramping period of the signal pulse. After reaching the peak voltage, the voltage abruptly drops back to the starting voltage over a short period of time, indicated by $T_2$. The abrupt change in voltage over the time period $T_2$ causes high acceleration of the drive surface 28 and slippage between the drive surface 28 and a mount body in frictional engagement with the drive surface 28. This entire cycle takes place over a time period $T_1+T_2$, which may then be repeated, as shown in FIG. 4B. The voltage signal pulse of FIG. 3A may be repeated as many times as necessary to achieve a desired amount of movement of the mount body relative to the piezoelectric inertia driver 10.

Figure 3B:
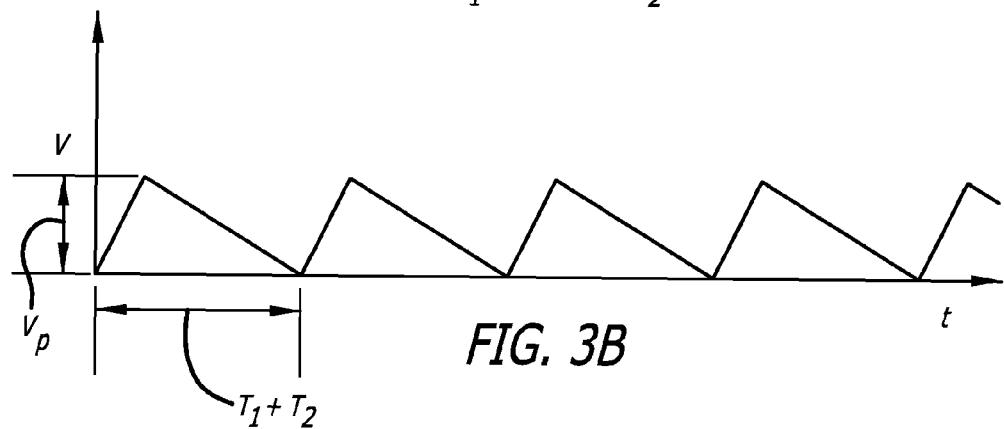
Figure 4A:
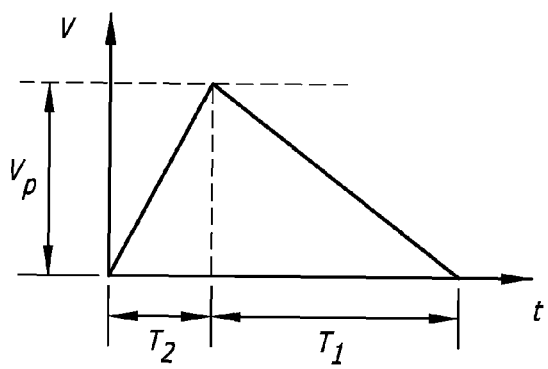
Figure 4B:
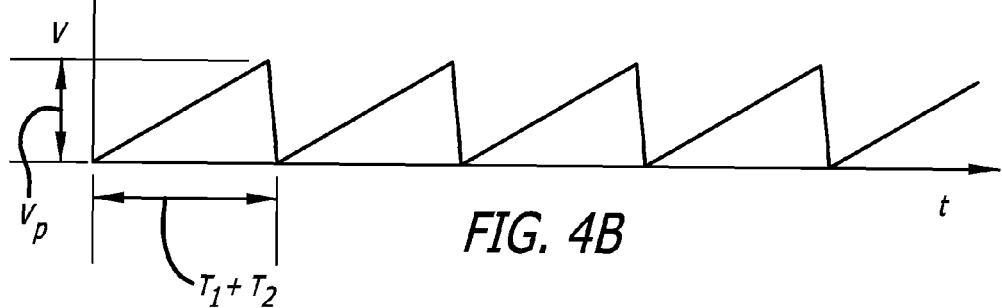

FIG. 4A shows a voltage signal profile similar to that of FIG. 3A, however, the pattern of FIG. 4A is configured to generate movement in the opposite direction of movement generated by the signal of FIG. 3A. In FIG. 4A, the voltage signal abruptly or rapidly ramps up from a starting voltage to the peak voltage $V_P$ over time period $T_2$. As with the voltage signal discussed above, the rapid or abrupt increase in voltage over time period $T_2$ causes slippage in the frictional engagement between the drive surface 28 and a mount body. As such, the mount body will not follow the motion of the drive surface 28 over this portion of the voltage signal cycle. The voltage then slowly ramps down from the peak voltage $V_P$ over time period $T_1$ to the starting voltage. The slower decrease in voltage results in movement of the movable portion of the mount body which is substantially the same as the movement of the drive surface 28 over this portion of the voltage signal. This drive signal shown in FIG. 4A may be repeated as many times as necessary to achieve a desired amount of mount body movement relative to the piezoelectric inertia driver 10. FIG. 3B shows a series of pulses similar to the drive signal pulse in FIG. 4A. Peak voltage $V_P$ for some voltage signal pulse embodiments may be about 10 Volts to about 200 Volts, more specifically, about 10 Volts to about 50 Volts. For some embodiments, the period $T_1+T_2$ of the voltage signal pulses may be about 0.1 msec to about 2.0 msec and the period T2 for the rapid or abrupt voltage change portion of the pulse alone may be about 50 nsec to about 5 microsecond.

The amount of movement generated between the piezoelectric inertia driver 10 and a mount body in frictional engagement with the drive surface 28 of the driver 10 may be varied and controlled in a variety of ways. For a given voltage signal profile, the amount of movement may be controlled by controlling the number of signal pulses, such as the voltage signal pulses of FIGS. 3A and 4A, delivered to the piezoelectric element. Because each voltage signal pulse corresponds to a substantially fixed amount of movement, the number of pulses delivered will be proportional to the total amount of movement generated by the pulses. For a fixed number of voltage signal pulses, the amount of movement may be controlled by controlling the magnitude of the change in voltage from the start to the finish of the voltage signal pulse cycle. For example, if the peak voltage $V_P$ of the voltage signal pulses shown in FIGS. 3A and 4A was reduced by one half, with the voltage signal profile maintaining the same shape and configuration, the amount of movement generated by such a voltage signal pulse would be accordingly reduced.

For some controller embodiments 44, it may be desirable, in order to keep manufacturing costs to a minimum, to design the controller to deliver voltage signal pulses which all have a substantially constant peak voltage $V_P$ to a piezoelectric inertia driver 10. For such systems, the amount of movement generated by each voltage signal pulse may be controlled by controlling the change in voltage signal over the rapid rise or drop segment in voltage signal profile. A voltage signal pulse shown in FIG. 5A has a profile configuration which ramps up slowly to an intermediate voltage $V_{int}$ between the start voltage and the peak voltage $V_P$ over a time period $T_{int}$. During the time period $T_{int}$, the mount body in frictional engagement with the drive surface 28 of the driver 10 moves with the drive surface 28. Upon reaching the intermediate voltage $V_{int}$, the signal voltage abruptly increases to the peak voltage $V_P$ over time period $T_{rapid}$. During the time period Trapid, slippage occurs between the mount body and the drive surface, as discussed above, and the mount body has minimal movement during this period.

Figure 5A:
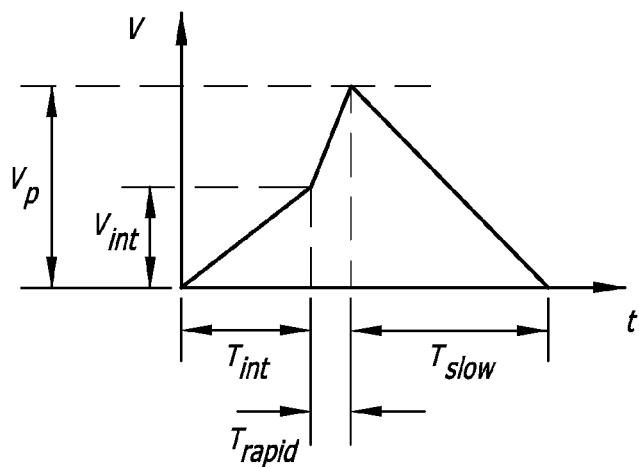
Figure 5B:
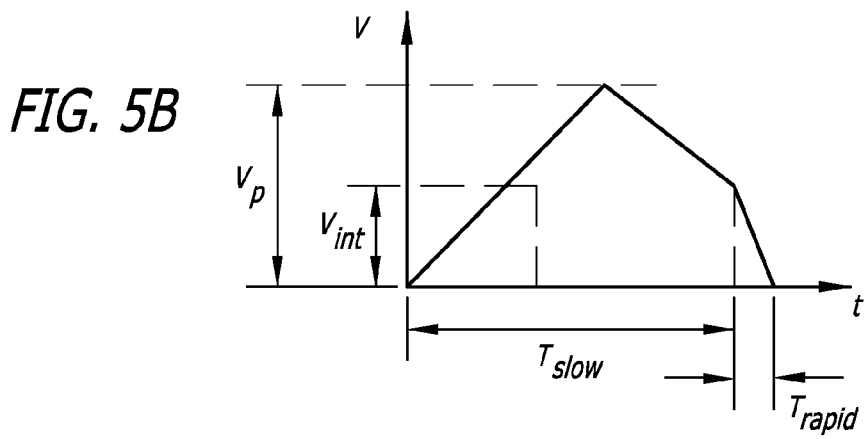

Upon reaching the peak voltage $V_P$, the voltage then ramps back down slowly over time period $T_{slow}$ to the starting voltage during which the mount body is once again moving with the drive surface 28. As such, the signal pulse profile of FIG. 5A generates less overall displacement between the mount body and the driver 10 than would a pulse signal configured as that of FIG. 4A having a comparable peak voltage $V_P$. FIG. 5B shows a similar reduced displacement signal profile, but in a motion direction opposite to that of FIG. 5A. The signal pulse profile of FIG. 5B includes a slow voltage rise to the peak voltage $V_P$ and slow decrease in voltage back down to $V_{int}$ over time period $T_{slow}$. Upon reaching $V_{int}$, the voltage of the pulse then drops abruptly back to the start voltage over time period $T_{rapid}$. As such, the signal pulse profile of FIG. 5B generates much less overall displacement between the mount body and the driver 10 than would a pulse signal configured as that of FIG. 3A having a comparable peak voltage $V_P$.

Figure 6A:
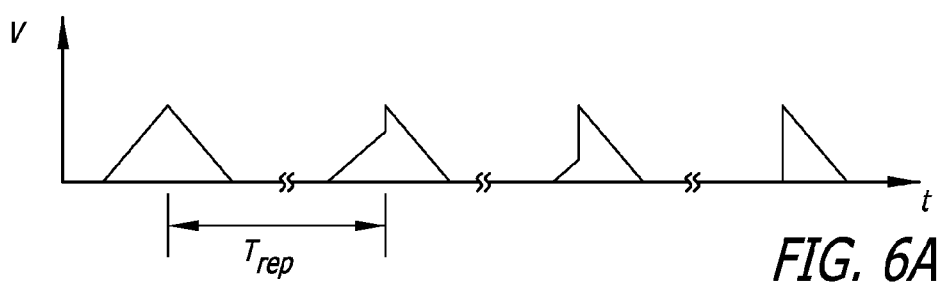
Figure 6B:
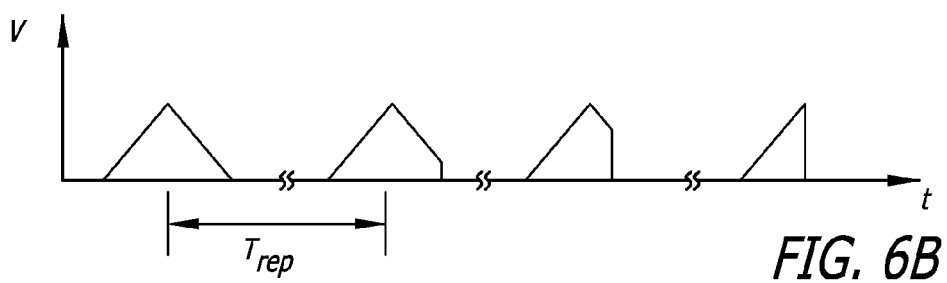

The amount of precision that an operator using a controller embodiment 44 and the voltage signal profiles discussed herein may be affected by the magnitude of movement generated from each voltage signal pulse delivered, but may also be affected by the number of pulses delivered in a given time period. A controller that is delivering a large number of voltage signal pulses in a short time will cause rapid movement of a mount body which may be difficult to control. Delivering the same voltage signal pulses at a slow repetition rate allows the user to have more precise control. A voltage signal profile may also be configured to change both the frequency of the voltage signal pulse delivery and the magnitude of motion generated by each pulse over time in order to steadily increase or decrease the speed of the mount body movement. For example, the voltage signal of FIG. 6A shows a series of voltage signal pulses delivered at a slow repetition rate separated by time period $T_{rep}$ with each successive pulse generating more movement of a mount body until the last pulse profile is reached which has a full displacement profile, and which has a similar pulse profile to the pulse shown in FIG. 4A. Once a full displacement profile has been reached, the frequency of delivery of the pulses may then be increased to further increase the speed of movement until the frequency reaches the maximum frequency as shown in the voltage signal profile of FIG. 3B. A similar configuration may be used for pulse profiles such as that of FIG. 5B, which is shown in FIG. 6B. For some embodiments, signal pulses having a full displacement profile delivered at a maximum frequency may generate movement of a mount body at a speed of about 0.1 mm/sec to about 1 mm/sec.

A controller 44 that uses these voltage signal profiles and methods discussed above allows a user to initiate actuation of the piezoelectric inertia driver 10 and subsequent movement of a mount body with small displacement pulses at a low repetition rate. If the actuation is continued, the displacement of each successive pulse may be increased until a full displacement pulse profile is reached, at which point, the controller may start to increase the repetition rate of the full displacement pulses delivered. The repetition rate for some embodiments may be increased from a starting slow repetition rate of about 2 Hz to about 20 Hz, and increased to a more rapid repetition rate of about 0.5 kHz to about 2 kHz.

Referring to FIGS. 7 and 8, a mount for optical adjustment 46 is shown that is configured to adjust an optical element by double axis rotation. The mount for optical adjustment 46 includes a first mount body 48 that provides a base and a second mount body 52 which pivots relative to the first mount body 48 at a pivot point 54 disposed between the first mount body 48 and second mount body 52. The pivot point 54 for the embodiment shown is a single ball bearing 56 disposed between a detent 58 of an adjustable barrel 62 that may be secured to the first mount body 48 by a set screw 64 and a detent (not shown) in the second mount body 52. The second mount body 52 also has a first drive surface 66 with a constant radius of curvature relative to the pivot point 54 and a second drive surface 68 with a constant radius of curvature relative to the pivot point 54. The detent in the second mount body 48 is disposed between the first drive surface 66 and the second drive surface 68 on an outer edge of the second mount body 52. The second mount body 52 also has a central aperture 72 disposed through it which allows light to pass through the middle of the second mount body 52.

The second mount body 52 is configured to mount an optical element thereto by means of an optical element mounting recess 74 is disposed about the central aperture 72 and has a set screw 76 for holding an optical element, such as the lens 78, in place. Although shown with a lens 78 mounted in the mounting recess 74, any of the optical elements discussed above may also be so mounted. In addition, the second mount body 52 may be configured to mount an optical element thereto by any other suitable means. For example, an optical element may be bonded to the second mount body 52, held in place by fasteners such as screws or bolts, have mounting locations such as threaded holes disposed thereon suitable for directly mounting an optical element or for mounting a bracket or other device that is suitable for mounting an optical element. The first mount body 48 and second mount body 52 may be made from any suitable high strength material with sufficient thermal stability. Materials such as aluminum, steel, including stainless steel, composites and the like may be used. The transverse dimensions of the first mount body 48 may be about 10 mm to about 200 mm, for some embodiments.

A first piezoelectric inertia driver 10 is configured to impart relative movement between the first mount body 48 and the second mount body 52 in a first axis direction as shown by arrows 82, and includes a drive surface 28 which is frictionally engaged with the first drive surface 66 of the second mount body 52. A second piezoelectric inertia driver 10' is configured to impart relative movement between the first mount body 48 and the second mount body 52 in a second axis direction as indicated by arrows 84, and includes a drive surface 28' which is frictionally engaged with a second drive surface 68 of the second mount body 52. The first and second piezoelectric inertia drivers 10 and 10' are held in place to slots 86 in the first mount body 48 by a plurality of fasteners, such as screws 88. In the embodiment shown, the first and second piezoelectric inertia drivers 10 and 10' are disposed substantially opposite a center of the central aperture 72 of the second mount body 52. For some embodiments, the drive surfaces 28 and 28' of the piezoelectric inertia drivers 10 and 10', respectively, may be hard dry surfaces configured to engage a hard dry surface of the first and second drive surfaces 66 and 68 of the second mount body 52. It may be useful for some embodiments for the frictional engagement to be arranged with dissimilar materials, such as dissimilar metals, to prevent galling or other problems associated with frictional engagement of similar materials or metals. For example, in some embodiments, the drive surfaces 28 and 28' may include a smooth dry steel surface, and the drive surfaces 66 and 68 may include smooth dry hard anodized aluminum surfaces. Other surfaces may include ceramic surfaces, composite surfaces and the like.

Each piezoelectric inertia driver 10 and 10' may be controlled by a single controller 44 or two separate controllers 44, in communication with respective piezoelectric members 38 and 38' thereof, in order to apply a desired amount of adjustment to each piezoelectric inertial driver 10 and 10' and corresponding rotational axis of the second mount body 52. FIG. 7 illustrates an embodiment of controller 44 having 2 columns of control buttons 49 and 49' for controlling the parameters of a drive signal delivered to the piezoelectric inertia drivers 10 and 10'. Each column of buttons 49 and 49' corresponds to a separate control channel, indicated at the bottom of each respective row of buttons by channel number markers 50 and 50', which may be used to control one or more corresponding piezoelectric inertia drivers 10 or 10'. For the embodiment shown, a separate conductor harness 40 and 40' may be in communication between the controller 44 and each respective piezoelectric inertia driver 10 and 10' so that each channel or column of buttons 49 and 49' corresponds to and controls a separate corresponding piezoelectric inertia driver 10 and 10'.

If an external (or internal) switch (not shown) is in communication with an output of the controller 44, each column of buttons or channel 49 and 49' may be configured to control multiple piezoelectric inertia drivers 10 in sequence by selectively switching the channel to communicate with a desired driver 10 in communication with the switch. As discussed above, the controller 44 may be configured to control the displacement of the mount body 52 relative to the drivers 10 and 10' in a variety of ways in order to give the operator the level of control and precision of movement desired. For channel 49, the top 2 buttons 50 allow an operator to select the magnitude of the minimum step or movement generated by a voltage signal pulse. The lower set of 6 buttons provide for adjustment in each direction, at three different speeds. Button 50A generates fast forward adjustment, button 50B generates forward adjustment at an intermediate speed and button 50C generates slow forward adjustment. Button 50D generates slow reverse adjustment, button 50E generates reverse adjustment at an intermediate speed and button 50F generates fast reverse adjustment. The buttons of channel 49' provide the same levels and direction of adjustment for that channel.

In addition, control of movement of the second mount body 52 may optionally be further enhanced with the availability of position information feedback of the second mount body 52 for the controller 44. Position information may be generated by a first encoder 92 in communication with the controller 44. The first encoder 92 may be disposed adjacent the first piezoelectric inertial actuator 10 and be configured to read a first encoder strip 94 disposed adjacent the first drive surface 66. A second encoder 96 in communication with the controller 44 may be disposed adjacent the second piezoelectric inertial actuator 10' and be configured to read a second encoder strip 98 disposed adjacent the second drive surface 68. For some embodiments, the first and second encoders 92 and 96 are optical encoders that may determine the position of the second mount body 52 relative to the first mount body 48 to a resolution that substantially corresponds to the displacement resolution of the piezoelectric inertia driver 10.

For some embodiments, the displacement resolution, i.e., smallest increment of reliable displacement, for the piezoelectric inertia driver 10 may be about 5 nm to about 20 nm. Encoders 92 and 96, in communication with respective encoder strips 94 and 98, may have a displacement resolution of about of about 5 nm to about 50 micrometers. High resolution encoder embodiments may have a resolution of about 5 nm to about 20 nm, however, these encoder embodiments are generally expensive. For some embodiments, in order to keep the cost of the encoders 92 and 96 and respective encoder strips 94 and 98 low, low resolution encoders and respective encoder strips may be used in conjunction with a controller algorithm which measures the amount of time taken for constant velocity movement of the mount body 52 between two encoder strip reference points, and extrapolates or interpolates the position of the mount body 52 based on the time and direction of motion. Some embodiments of low cost encoders and encoder strips may have a nominal resolution of about 20 micrometers to about 30 micrometers.

Some controller 44 embodiments may allow the piezoelectric inertia drivers 10 and 10' to operate in a closed loop control manner when used in conjunction with the encoders 92 and 96 and encoder strips 94 and 98. In such a configuration, an adjustment to position may be input by an operator into the controller 44 and a resulting displacement signal transmitted to the piezoelectric member 38 and 38' from the controller 44. As the piezoelectric inertia drivers 10 and 10' actuate translation in response to the displacement signal from the controller 44, the physical movement of a body, such as the second mount body 52, being displaced by the drive surface 28 of the piezoelectric inertia drivers 10 and 10' is measured by the encoders 92 and 96. When the displaced body 52 reaches the position input by the operator, the displacement signal to the piezoelectric inertia drivers 10 and 10' may be terminated by the CPU of the controller 44.

Figure 9:
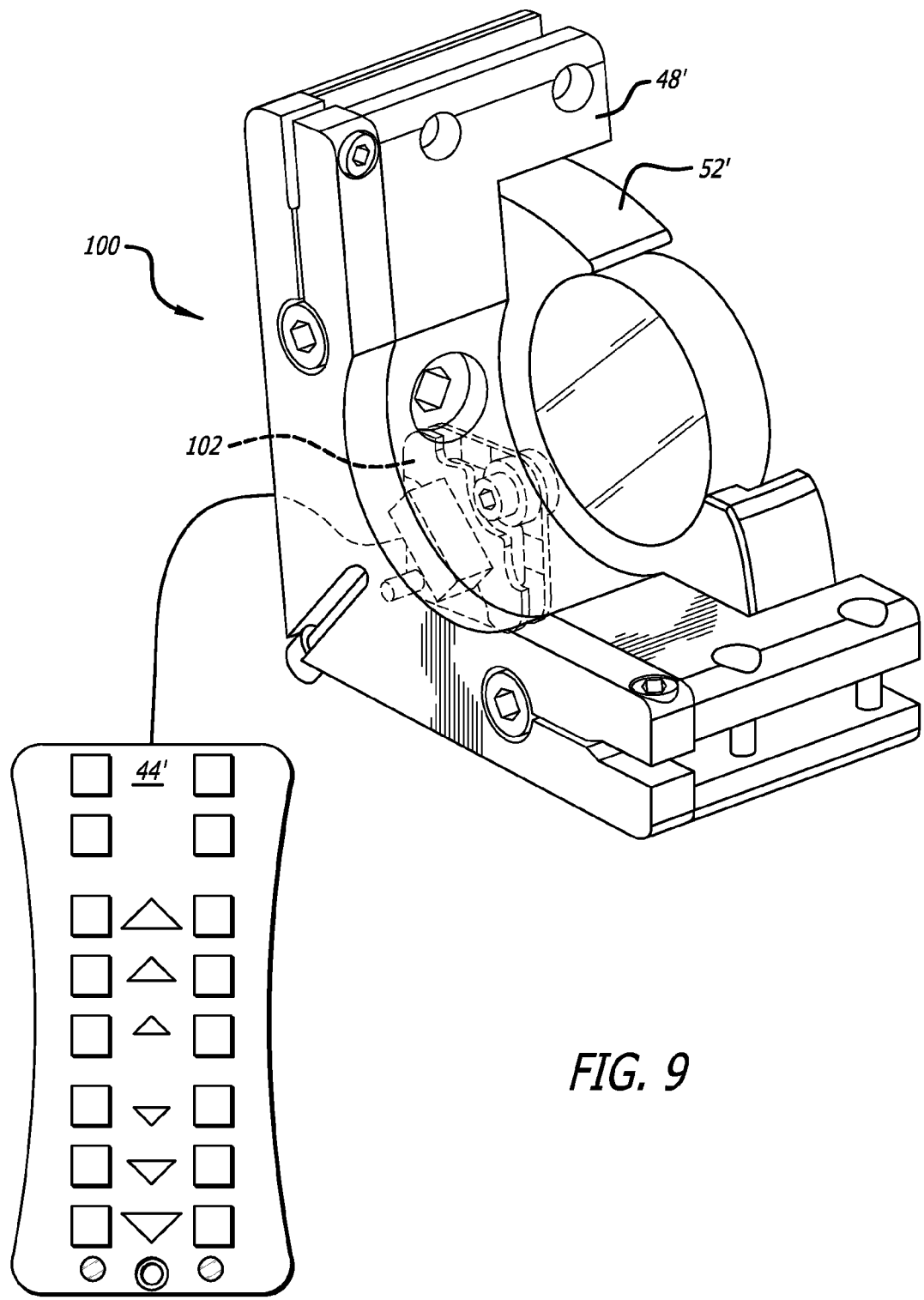
FIG. 9 shows a perspective view of an embodiment of an adjustable optical mount capable of generating position data.
Figure 10:
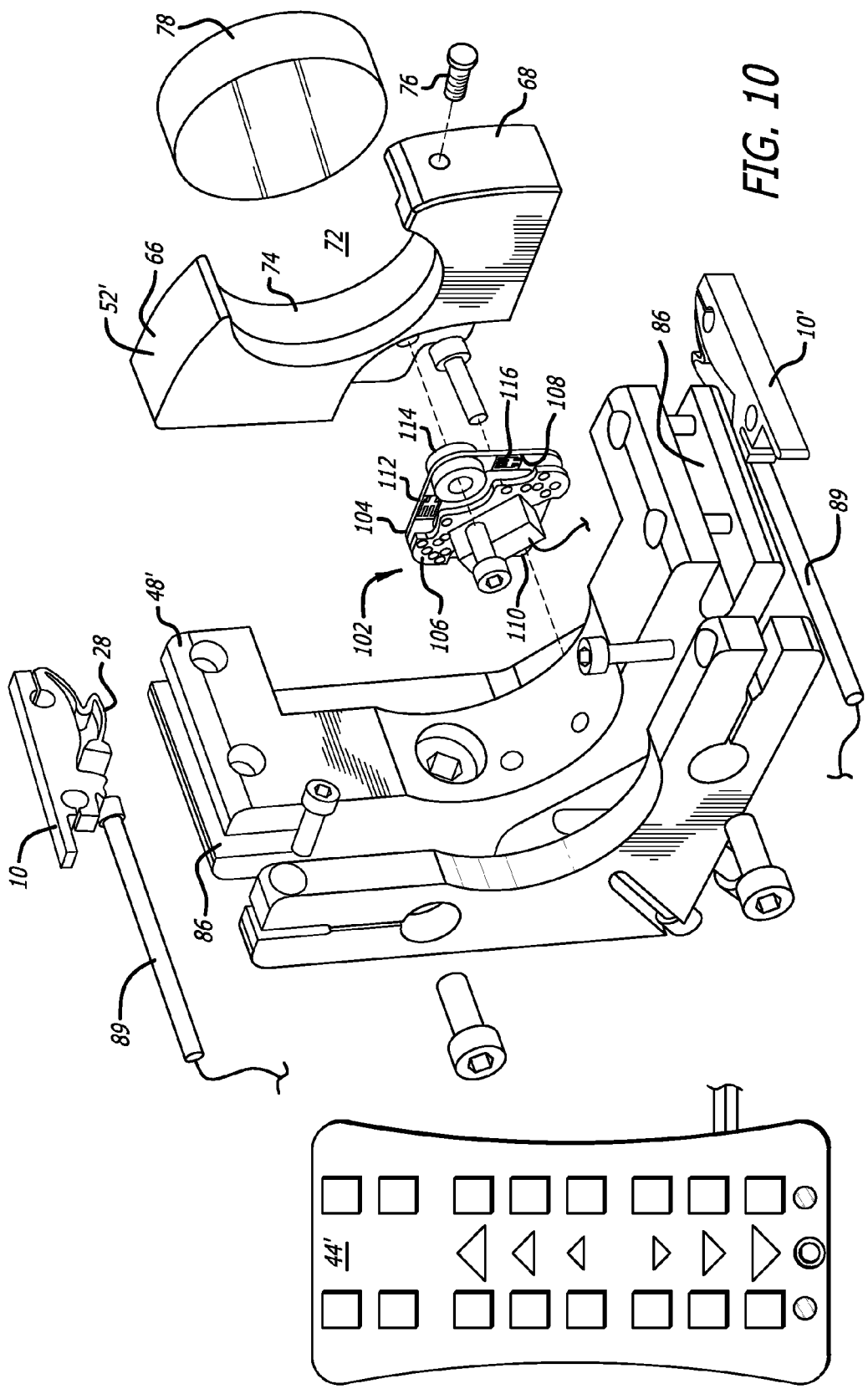
FIG. 10 is an exploded view of the adjustable optical mount of FIG. 9.
Figure 10A:
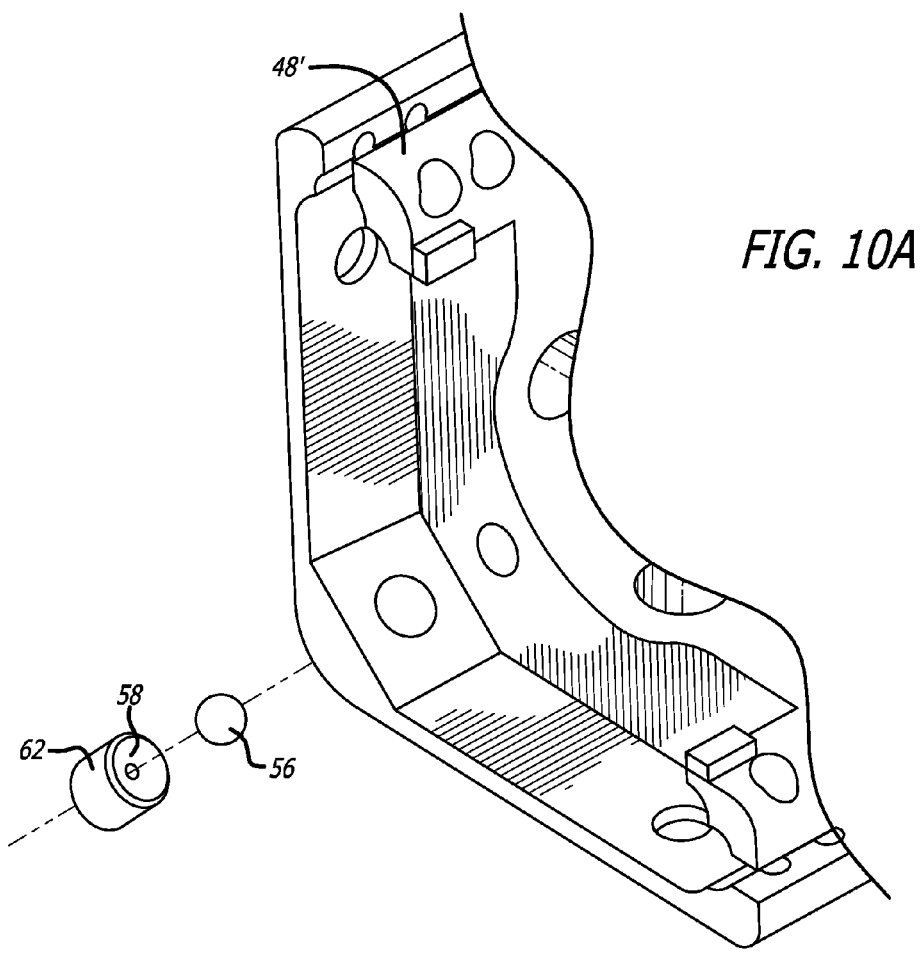
FIG. 10A is a perspective view of a first mount body of the optical mount of FIG. 9.

The adjustable optical mount embodiment 46 shown in FIG. 7 includes position feedback via one or more encoders, such as optical encoders, and associated encoder strips that may be used to determine the magnitude of a displacement of the second mount body in one or more degrees of freedom. This type of arrangement may be useful in order to determine the amount of displacement that occurs during an adjustment and may be used to determine the position of the second mount body relative to the position of the first mount body. Such an encoder arrangement may not always provide absolute position data if the mount bodies slip when the encoders are not recording movement such as when the system is shut down. FIGS. 9-11 illustrate an embodiment of a mount for optical adjustment 100 that generates absolute position data rather than displacement data. Such a configuration may useful for returning the optical mount 100 to a previous position after a disturbance or adjustment, regardless of whether the disturbance occurs during operation.

The mount embodiment 100 shown in FIGS. 9-11 includes the ability to generate position data regarding the absolute position of the second mount body relative to the position of the first mount body independent of displacement data. The adjustable optical mount embodiment 100 of FIG. 9 may include some or all of the features, dimensions and materials of the mount for optical adjustment 46 discussed above and shown in FIG. 7. The position data for the mount embodiment 100 shown is generated by a position measurement module 102 that includes a strain gauge assembly 104 and a circuit board embodiment 106 which is secured to the strain gauge assembly 104. The circuit board 106 may be in operative communication with a controller 44' that may be used for measuring, interpreting and storing data generated by the strain gauges of the module. The controller may also be used to control the movement of adjustment actuators of the adjustable mount, such as piezoelectric actuators. As such, for some embodiments, the controller 44' may include a processor, such as a computer processor, RAM, memory and other elements that may be useful to the collection, manipulation and storage of data. The strain gauges 108, circuit board 106 and controller 44' may be operatively coupled by any suitable device or method including electrical conductors such as copper wire, optical fiber, radio transmission including known wireless communication protocols, and the like.

For the position measurement module embodiment 102 shown, a first portion 110 of the flexible substrate 112 of the strain gauge assembly 104 is secured to a first mount body 48' of the adjustable optical mount 100 while a second portion 114 of the flexible substrate 112 is secured to a second mount body 52' of the adjustable optical mount 100. With such a configuration, the relative static position between the first mount body 48' and second mount body 52' of the adjustable mount 100 causes a fixed strain of the flexible substrate 112 as well as causing a strain of the one or more strain gauges 108 secured to the flexible substrate 112. For the resistive strain gauge embodiments 108 of the strain gauge assembly 104 shown, the strain imposed on the strain gauges 108 may alter the resistance or impedance of the strain gauge circuit 116 which may then be measured by the associated circuitry including the circuitry of the circuit board 106 and controller 44. Once this arrangement of strain gauge assembly 104 is properly calibrated, it may be used to measure the absolute position of the first mount body 48' relative to the second mount body 52' regardless of what displacement or displacements were used to achieve the position. Other types of strain gauges 108 may also be used to measure strain of the flexible substrate of the strain gauge assembly.

Some embodiments of the adjustable optical mount 100, may include a first mount body 48', a second mount body 52', a flexible substrate 112, and a strain gauge element 108. The second mount body 52' may be configured to secure an optical element thereto and may be movable relative to the first mount body 48' in an adjustable degree of freedom. In addition, the flexible substrate 112 may include a first portion secured to the first mount body 48' and a second portion secured to the second mount body 52'. Furthermore, the strain gauge element 108 may be mechanically secured to the flexible substrate 112 and configured to register strain of the flexible substrate 112 and generate a signal in response to a strain of the flexible substrate 112.

As with the adjustable optical mount 46 of FIG. 7, the adjustable optical mount embodiment 100 shown in FIGS. 9-11 includes a first mount body 48' that provides a base and a second mount body 52' which pivots relative to the first mount body 48' at a pivot point disposed between the first mount body 48' and second mount body 52'. For some embodiments, the pivot point may be formed by the flexible substrate 112 of the strain gauge assembly 104. For some embodiments, the pivot point may optionally include a single ball bearing 56 disposed between a detent 58 of an adjustable barrel 62 that may be secured to the first mount body 48' by a set screw and a detent (not shown) in the second mount body 52'. The second mount body 52' also has a first drive surface 66 with a constant radius of curvature relative to the pivot point 54 and a second drive surface 68 with a constant radius of curvature relative to the pivot point 54. For some embodiments, a virtual pivot point 54' may be disposed at approximately the center of the aperture of the flexible substrate 112 as shown in FIG. 13A. The detent in the second mount body 52' may be disposed between the first drive surface 66 and the second drive surface 68 on an outer edge of the second mount body 52'. The second mount body 52' also has a central aperture 72 disposed through it which allows light to pass through the middle of the second mount body 52'.

The second mount body 52' may be configured to mount an optical element thereto by means of an optical element mounting recess 74 or the like which is disposed about the central aperture 72. The optical element mounting recess has a set screw 76 for holding an optical element, such as the lens 78, in place. Although shown with a lens 78 mounted in the mounting recess 74, any of the optical elements discussed above may also be so mounted. In addition, the second mount body 52' may be configured to mount an optical element thereto by any other suitable means. For example, an optical element may be bonded to the second mount body 52' by a suitable adhesive, held in place by fasteners such as screws or bolts, have mounting locations such as threaded holes disposed thereon suitable for directly mounting an optical element or for mounting a bracket, or other device that is suitable for mounting an optical element. The first mount body 48' and second mount body 52' may be made from any suitable high strength material with sufficient thermal stability. Materials such as aluminum, steel, including stainless steel, composites and the like may be used. The transverse dimensions of the first mount body 48 may be about 10 mm to about 200 mm, for some embodiments.

As discussed above with regard to the optical mount embodiment 46, a first piezoelectric inertia driver 10 may be configured to impart relative movement between the first mount body 48' and the second mount body 52' in a first axis direction. The first piezoelectric driver 10 includes a drive surface 28 which may be frictionally engaged with the first drive surface 66 of the second mount body 52'. A second piezoelectric inertia driver 10' may be configured to impart relative movement between the first mount body 48' and the second mount body 52' in a second axis direction. The second piezoelectric driver may include a drive surface 28' which is frictionally engaged with a second drive surface 68 of the second mount body 52'. The first and second piezoelectric inertia drivers 10 and 10' may be held in place to slots 86 in the first mount body 48' by means of respective mounting rods 89 and a plurality of fasteners, such as screws 88. In the embodiment shown, the first and second piezoelectric inertia drivers 10 and 10' may be disposed substantially opposite a center of the central aperture 72 of the second mount body 52'. For some embodiments, the drive surfaces 28 and 28' of the piezoelectric inertia drivers 10 and 10', respectively, may be hard dry surfaces configured to engage a hard dry surface of the first and second drive surfaces 66 and 68 of the second mount body 52'. It may be useful for some embodiments for the frictional engagement to be arranged with dissimilar materials, such as dissimilar metals, to prevent galling or other problems associated with frictional engagement of similar materials or metals. For example, in some embodiments, the drive surfaces 28 and 28' may include a smooth dry steel surface, and the drive surfaces 66 and 68 may include smooth dry hard anodized aluminum surfaces. Other surfaces may include ceramic surfaces, composite surfaces and the like.

Each piezoelectric inertia driver 10 and 10' may be controlled by a controller 44', the controller being in operative communication with respective piezoelectric members 38 and 38' thereof. The controller 44' may be used by an operator to apply a desired amount of adjustment to each piezoelectric inertial driver 10 and 10' and corresponding rotational axis of the second mount body 52 as discussed above with regard to adjustable mount 46. For some embodiments, the displacement resolution, i.e., smallest increment of reliable displacement, for the piezoelectric inertia driver 10 may be about 5 nm to about 20 nm. The same controller 44' may also be operatively coupled to the position measurement module shown in FIG. 10. The controller 44' may also include a position analysis module that is configured to measure, interpret and store data generated by the strain gauges of the position measurement module.

Some controller embodiments 44' may allow the piezoelectric inertia drivers 10 and 10' to operate in a closed loop control manner when used in conjunction with the position measurement module. In such a configuration, an adjustment to position may be input by an operator into the controller 44' and a resulting displacement signal transmitted to the piezoelectric member 38 and 38' from the controller 44'. As the piezoelectric inertia drivers 10 and 10' actuate translation in response to the displacement signal from the controller 44', the physical movement of a body, such as the second mount body 52, being displaced by the drive surface 28 of the piezoelectric inertia drivers 10 and 10' is measured by the strain gauge or gauges of the strain gauge assembly of the position measurement module. When the displaced body 52 reaches the position input by the operator, the displacement signal to the piezoelectric inertia drivers 10 and 10' may be terminated by the CPU of the controller 44'.

As discussed above, adjustable mount 100 includes a first mount body 48' and a second mount body 52'. The mount 100 is configured to secure an optical element to the second mount body 52'. The second mount body 52' is movable relative to the first mount body 48' in a first adjustable degree of freedom and a second adjustable degree of freedom. The mount 100 includes a first driver 10 configured to controllably impart relative movement in the first adjustable degree of freedom between the first mount body 48' and the second mount body 52' and a second driver 10' configured to controllably impart relative movement in the second adjustable degree of freedom between the first mount body 48' and the second mount body 52'. As shown in FIGS. 10-12, the mount 100 includes a position measurement module 102 having a flexible substrate embodiment 112. The flexible substrate embodiment 112 includes a thin flexible sheet with one or more strain gauge elements 118 mechanically secured to the flexible substrate 112. The strain gauge elements 118 may be configured to register strain of the flexible substrate 112 and generate a signal in response to a strain of the flexible substrate 112. A first portion 110 of the flexible substrate 112 may be secured to the first mount body 48' and a second portion 114 of the flexible substrate 112 may be secured to the second mount body 52' so as to produce a strain profile in the one or more strain gauge elements 118 of the flexible substrate 112 that corresponds to a strain of the flexible substrate 112. For such an arrangement, the absolute position of the second mount body 52' relative to the first mount body 48' may be determined by the combined positions of the second mount body 48' along the first and second adjustable degrees of freedom. Each possible position of the second mount body 52' relative to the first mount body 48' may also correspond to a unique strain gauge element output signal profile which may be measured and analyzed by the controller 44', or components thereof, which is in operative communication with the one or more strain gauge element 118. As such, the controller 44' may be configured to generate position data from the strain gauge element signal.

FIG. 12 illustrates the position measurement module embodiment 102 that may include a strain gauge assembly 104 including a flexible substrate 112 and one or more strain gauge elements 118 or strain gauges 108, and a circuit board 106 which may be operatively coupled or otherwise electrically connected to the strain gauge elements 118 of the flexible substrate 112. Although the circuit board 106 is disposed adjacent the flexible substrate 112 of the strain gauge assembly 104, the circuit board 106 is configured to be mechanically independent of the flexible substrate 112 so as not to hinder the natural strain induced on the flexible substrate 112 by the relative movement or positions of the second mount body 52' and first mount body 48'. For some embodiments, the circuit board 106 may be in contact with a first mount 120 or second mount 122 of the flexible substrate 112. In some cases, the circuit board 106 may include electronic circuits configured to calibrate the output signal or signals of the strain gauge elements 118 or the strain gauges 108 of the strain gauge assembly 104. The circuit board 106 may have a terminal array or terminal coupler 124 for convenient connection to a controller 44' or other component of the adjustable mount system 100. The terminal coupler 124 for the embodiment shown includes 6 conductive terminals that are in electrical communication with the circuitry of the circuit board 106 and a coupler housing 126 configured to be detachably secured to a wire harness (not shown) having 6 conductors such as copper wires that correspond to each conductive terminal. The 6 conductors may be in electrical communication with the circuitry of the controller 44'. The terminals of the coupler 124 may include a first terminal 130, a second terminal 131, a third terminal 132, a fourth terminal 133, a fifth terminal 134 and a sixth terminal 135 (see also FIG. 22A). Some or all of these terminals may be coupled to various portions of circuits within the controller 44'. Such circuits may be configured to generate an output signal or signals that may be used to determine the position of the second mount body 52' relative to the first mount body 48'.

For the flexible substrate embodiment 112 shown in FIGS. 13A and 14A, four strain gauge elements 118 are mechanically secured to the flexible substrate 112. For some embodiments, the flexible substrate 112 may include a thin flexible sheet of material between two substantially parallel surfaces. There may be an aperture 113 disposed through a middle portion of the sheet to produce a ring-like structure that may have a variety of overall shapes. For the embodiment shown in FIGS. 13A and 14A, the flexible substrate includes a flat substantially square shaped plate or sheet with a substantially square aperture in the middle portion of the sheet. The square shape of the outer edge of the sheet is also substantially aligned with the square shaped aperture. The substantially square-shaped ring-like structure of the sheet and aperture may be configured to produce a perimeter region having four sides and four corners. A first portion of the flexible substrate 112, which may be secured to the first mount body 48', may be disposed at a first corner of the flexible substrate 112. A second portion of the flexible substrate 112, which may be secured to the second mount body 52', may be disposed at a second corner, the second corner being disposed opposite the aperture from the first corner in some circumstances. The flexible material of the flexible substrate 112 may be a resilient material that repeatedly returns to an initial configuration without plastic deformation for strains within predetermined magnitudes. In some cases, the material of the flexible substrate 112 may include metals such as aluminum, steel, bronze alloys including bronze beryllium alloys, composites such as fiberglass and epoxy composites, or the like. Embodiments of the flexible substrate may have a thickness of about 0.4 mm to about 1 mm and a transverse dimension from an outer edge of a side 138 to an outer edge of an opposite side 138 of about 12 mm to about 20 mm.

As shown in FIGS. 13A and 14A, a strain gauge element 118 is disposed along each of the four sides 138 of the substantially square flexible substrate 112. The strain gauge elements 118 are disposed between the first mount 120 and second mount 122 of the flexible substrate 112 on each side of the flexible substrate 112 between each of the corners of the flexible substrate for a total of 8 strain gauge elements 118. For the embodiment shown, each of the strain gauge elements 118 are disposed on a strain gauge body 136 of a strain gauge 108. Each strain gauge body 136 is mechanically secured and coupled to the flexible substrate 112 such that strain of the flexible substrate 112 is transferred at least partially to a strain gauge body 136 and strain gauge element 118 of the strain gauge 108 adjacent and mechanically coupled and secured to the flexible substrate 112. As shown in FIG. 13A, a strain gauge 108 is disposed in the middle of each side 138 of the outer perimeter of the flexible substrate 112 with elongated lengths of the conductive element 140 of the strain gauge 108 extending along the length of each side or substantially parallel to the inner or outer edge of each of the four sides 138 of the flexible substrate 112. There are four such strain gauges 108 mechanically coupled to both a top surface 142 and a bottom surface 144 of the substrate 112 for a total of 8 strain gauges 108 with corresponding strain gauge elements 118 disposed on and mechanically coupled to the flexible substrate 112.

For the embodiment shown, the strain gauges 108 on the top surface 142 and the corresponding strain gauges 108 on the bottom surface 144 are disposed substantially on opposite sides of the flexible substrate 112 from each other. In addition, in some instances, the four strain gauges 108 on the top surface 142 may be substantially equally spaced from each other along the perimeter of the flexible substrate 112. The four strain gauges 108 on the bottom surface 144 may be substantially equally spaced from each other along the perimeter of the flexible substrate 112. For some embodiments, 2 or more strain gauge elements 118 may be mechanically secured or mechanically coupled to the flexible substrate 112, more specifically, about 2 strain gauge elements 118 to about 20 strain gauge elements 118 may be mechanically coupled or secured to the flexible substrate 112, and even more specifically, about 6 strain gauge elements 118 to about 10 strain gauge elements 118 may be mechanically secured or coupled to the flexible substrate 112. FIGS. 13B and 14B show another embodiment of a strain gauge assembly 104' that may have the same features, dimensions or materials as those of strain gauge assembly 104 shown in FIG. 13A. The strain gauge assembly 104', however, has a substantially round shaped flexible substrate configuration with an aperture 113' disposed in a middle portion thereof.

For the resistive strain gauge embodiments 108 shown, each strain gauge element 118 includes an electrical circuit 146 which is configured to change electrical impedance in response to strain imposed on a conductive element of the strain gauge 108. An embodiment of such an electrical circuit 146 is shown in the strain gauge 108 illustrated in FIGS. 15, 15A and 15B. For this embodiment, the electrical circuit 146 includes a strain gauge conductive element 140 disposed in a substantially flat zig-zag pattern within an encapsulation material of the strain gauge body 136 or otherwise disposed on a strain gauge body material. For some embodiments, the strain gauge body material may include a metal such as aluminum, tungsten, alloys, or the like. Some strain gauge embodiments may include strain gauges manufactured by Vishay Measurements Group Ltd., Basingstoke, UK. The zig-zag pattern of the conductive element 140 for some strain gauge embodiments may be arranged with elongated sections disposed substantially parallel and in close proximity to each other with 180 degree turns at each end of the elongated sections. In some instances, a first end of the conductive element 140 terminates at a first output terminal 150 and a second end of the conductive element 140 terminates at a second output terminal 152. For some embodiments, the strain gauge body may have a length of about 1 mm to about 10 mm, a width of about 1 mm to about 10 mm and a thickness of about 0.2 mm to about 2 mm.

The conductive element 140 of the strain gauge element 118 may include a predetermined impedance or electrical resistance that may be determined by the length, transverse cross section and conductivity of the conductive element 140. A strain imposed on the conductive element 140 that elongates or stretches the elongated sections of the conductive element 140 will generally cause the elongated sections to become thinner with a reduced transverse cross section as well as a lengthening of the overall electrical current path of the conductive element 140. This mechanical response will thus cause the electrical resistance or impedance of the circuit 146 to increase. The magnitude of this increase in impedance can then be correlated to a known strain and position data generated therefrom. On the other hand, a strain imposed on the conductive element 140 that shortens or compresses the elongated sections of the conductive element 140 will generally cause the elongated sections of the conductive element 140 to become thicker with an increased transverse cross section as well as a shortening of the overall electrical current path of the conductive element 140. This mechanical response will thus cause the electrical resistance or impedance of the circuit 146 to decrease. The magnitude of this decrease in impedance can then be correlated to a known strain and position data generated therefrom.

Figure 16:
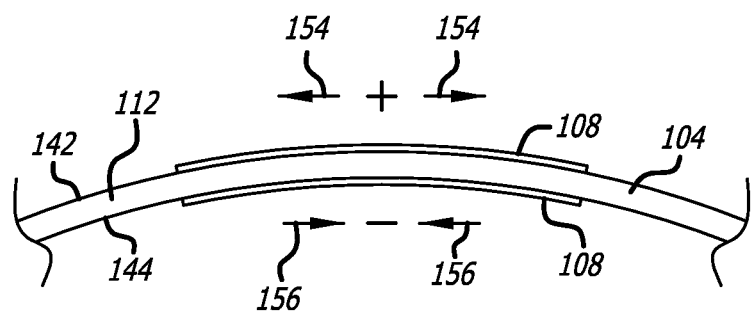
FIG. 16 illustrates a section of the strain gauge assembly embodiment of FIG. 13 under strain.

Referring to FIG. 16, a section of the flexible substrate embodiment 112 is shown that includes a first strain gauge 108 mechanically coupled to a first or top surface 142 of the flexible substrate 112 and a second strain gauge 108 mechanically coupled to a second or bottom surface 144 of the flexible substrate 112. The first strain gauge 108 is dispose substantially opposite the second strain gauge 108 with the sheet of flexible substrate 112 disposed between the strain gauges 108. The elongated sections of the conductive elements 140 of the first and second strain gauges 108 are both substantially aligned with each other and run substantially parallel to the length of the side 138 of the flexible substrate 112 or substantially parallel to an edge of the flexible substrate 112 as discussed above. When the section of flexible substrate 112 is bent or torqued as shown in FIG. 16, the elongated conductive elements 140 of the first strain gauge 108 on the top surface 142 of the flexible substrate 112 will be subjected to a tensile force as indicated by the arrows 154. The elongated conductive elements 140 of the second strain gauge 108 on the bottom surface 144 of the flexible substrate 112 will be subjected to a compressive force as indicated by arrows 156. As such, the electrical impedance or resistance of the circuit 146 of the first strain gauge 108 will increase by a magnitude that corresponds to the amount of bending strain on the flexible substrate 112 and first strain gauge 108. The electrical impedance or resistance of the circuit 146 of the second strain gauge 108 will decrease by a magnitude that corresponds to the amount of bending strain on the flexible substrate 112 and second strain gauge 108.

Figure 17:
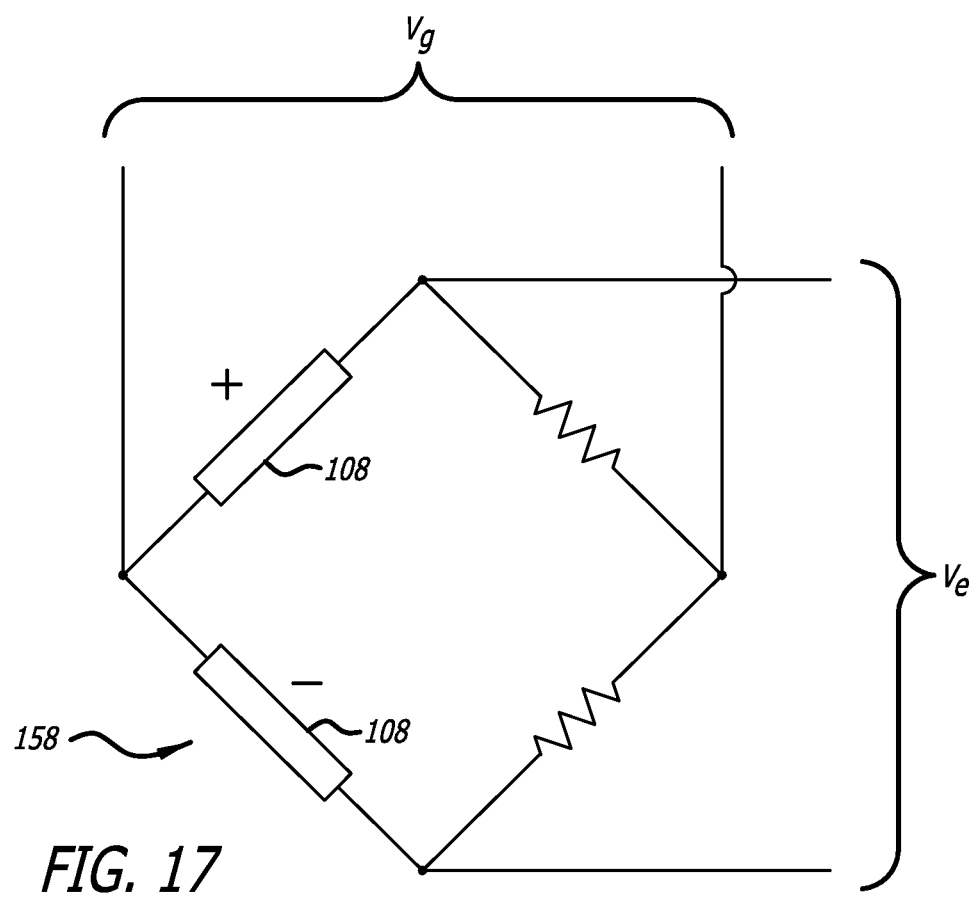
FIG. 17 is a schematic diagram of a circuit embodiment that may be useful in precisely measuring the strain of a pair of strain gauges disposed on opposite sides of a flexible substrate.

The impedance change signal of each of the first and second strain gauges 108 shown in FIG. 16 may be added and measured by an appropriately configured Wheatstone bridge circuit 158 as shown in FIG. 17. For the Wheatstone bridge circuit 158 of FIG. 17, the output of the output terminals 150 and 152 of the first strain gauge 108 may be coupled to the circuit 158 as shown. The output of the output terminals 150 and 152 of the second strain gauge 108 may be coupled to the Wheatstone bridge circuit 158 also as shown such that the absolute value of the magnitude of the change in impedance for each of the first and second strain gauges 108 will be added and measured by the Wheatstone bridge circuit 158. For the embodiment of the strain gauge assembly 104 shown in FIGS. 13A and 14A, which is mechanically coupled between the first mount body 48' and second mount body 52' as discussed above, the controller 44' or any other desired circuit, processor or the like may be configured to determine a unique position with respect to each degree or axis of freedom based on the impedance profile of the multiple strain gauges 108 of the strain gauge assembly 104. The strain gauge assembly 104 and flexible substrate shown may be subjected to different strain modes that may be analyzed differently by the controller 44', circuits of the circuit board 106, or both in order to determine the two axis position of the second mount body 52' relative to the first mount body 48'.

Figure 18A:
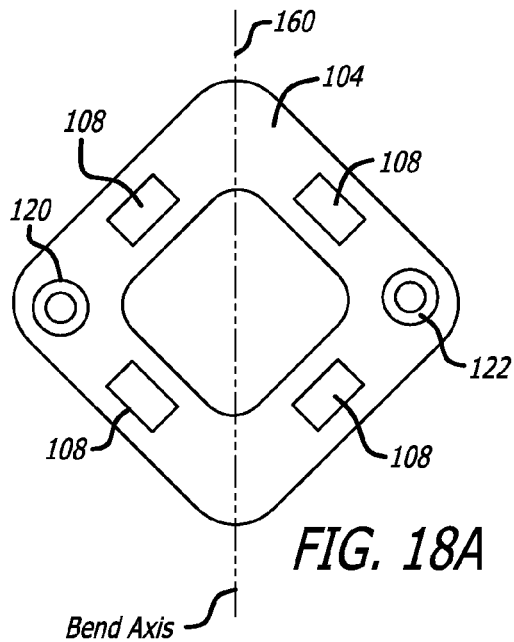
FIG. 18A is a top view of a strain gauge assembly embodiment strained to a bend along an axis between a first portion and a second portion, the axis being substantially perpendicular to a line intersecting a mount of the first portion and a mount of the second portion.
Figure 18B:
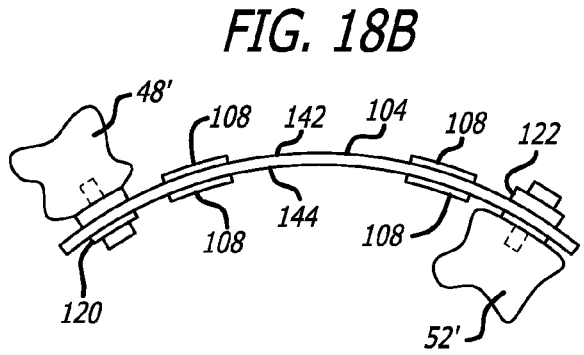
FIG. 18B is a side view of the strained strain gauge assembly of FIG. 18A.
Figure 19A:
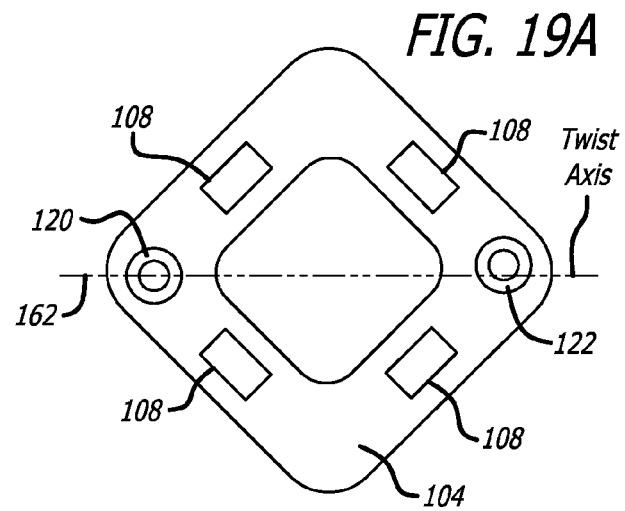
FIG. 19A is a top view of a strain gauge assembly embodiment strained in a twist along an axis that intersects a mount of a first portion and a mount of a second portion of the flexible substrate of the strain gauge assembly.
Figure 19B:
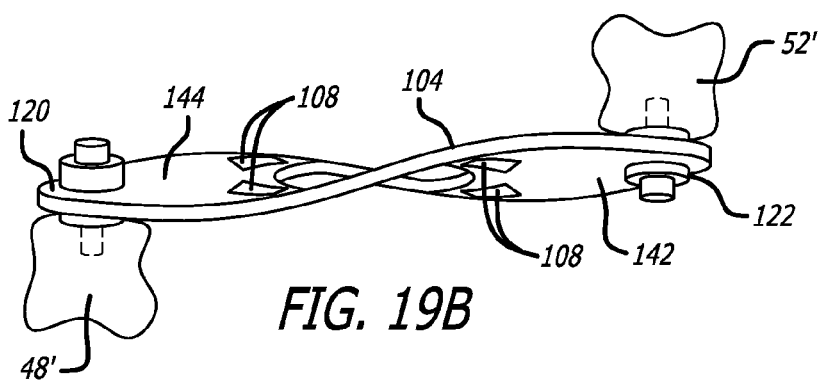
FIG. 19B is a side view of the strained strain gauge assembly of FIG. 19A.
Figure 21:
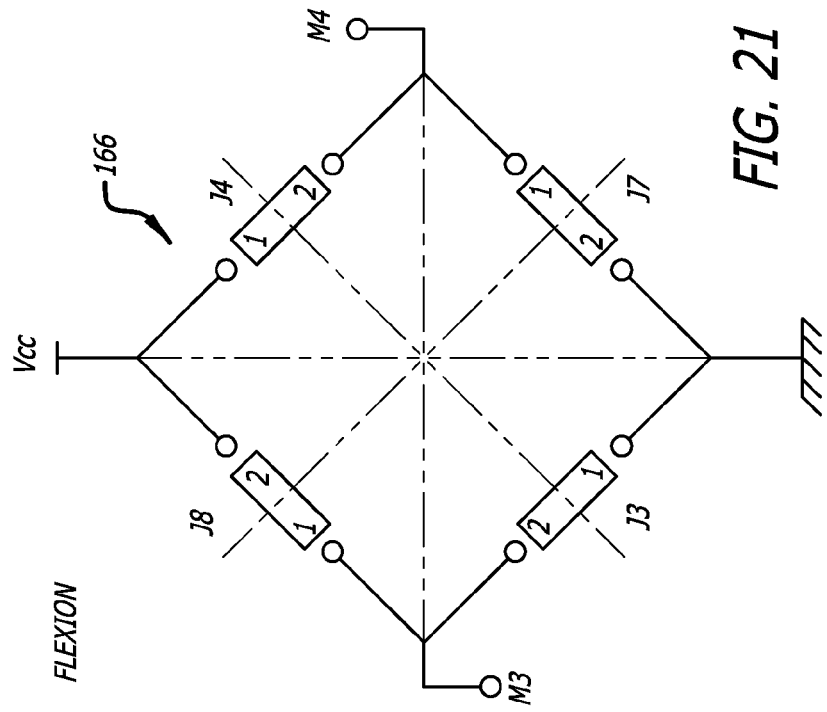
FIG. 21 is a schematic representation of a circuit embodiment for measuring strain gauge impedance.
Figure 20:
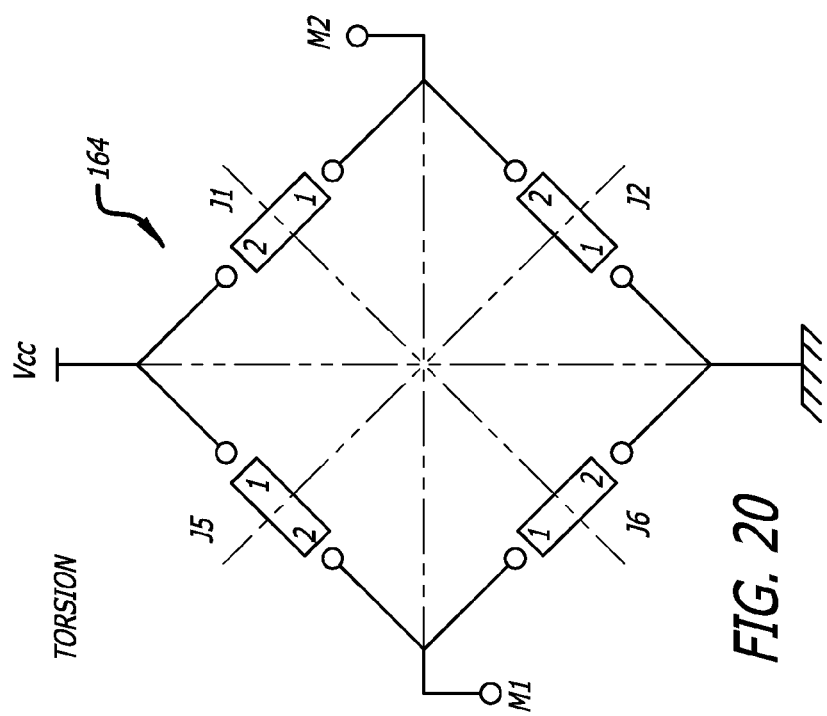
FIG. 20 is a schematic representation of a circuit embodiment for measuring strain gauge impedance.
Figure 22A:
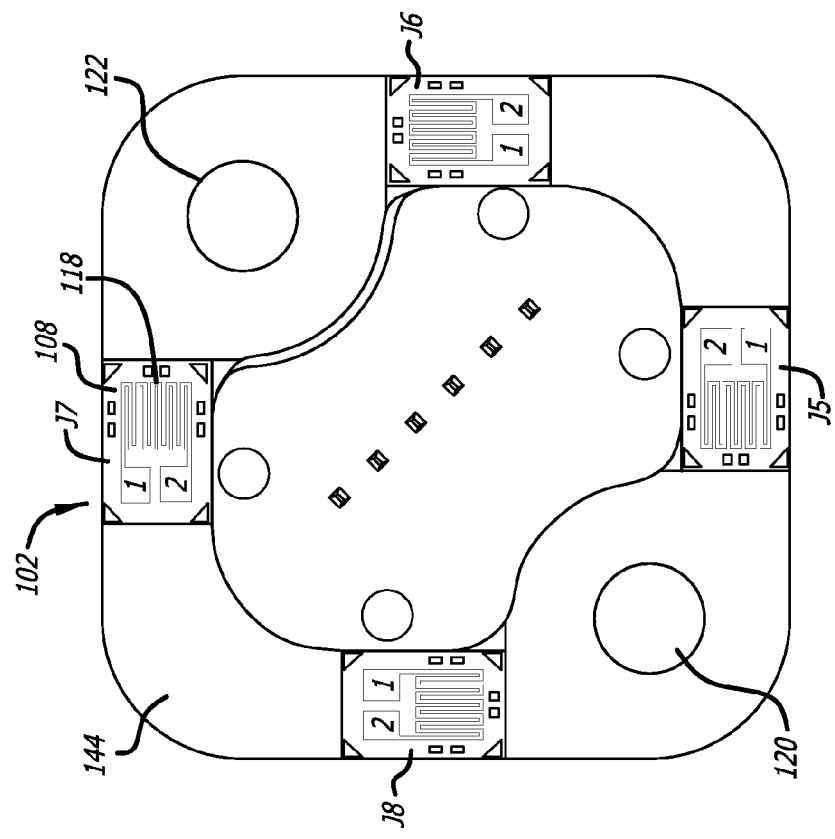
FIGS. 22A and 22B show both sides of the position measurement module of FIG. 12.
Figure 22B:
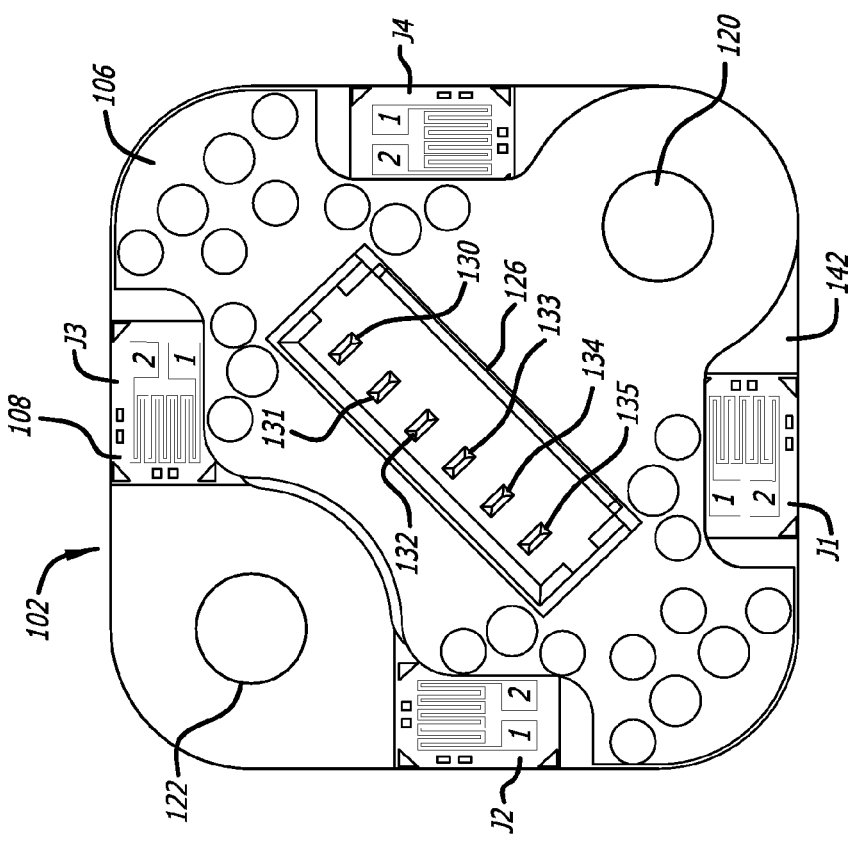

FIG. 18A shows the strain gauge assembly 104 with a dashed line 160 indicating a bending axis disposed between the first mount 120 and second mount 122 of the flexible substrate 112 and substantially perpendicular to a line drawn therebetween. Such a bending mode is illustrated in FIG. 18B where the flexible substrate 112 is being bent along the bending axis 160 so as to induce tension on the strain gauge elements 118 mounted on the top surface 142 and compression on the strain gauge elements 118 mounted on the bottom surface 144 of the flexible substrate 112. The signals from these strain gauges 108 may be coupled to and analyzed by circuitry which may include a Wheatstone bridge circuit 158 as discussed above with regard to FIG. 17. FIG. 19A shows the strain gauge assembly 104 with a dashed line 162 indicating a torquing or twist axis drawn between the first mount 120 and second mount 122 of the flexible substrate 112. Such a bending or twist mode is illustrated in FIG. 19B where the flexible substrate 112 is being twisted along the axis 162 so as to induce a combination of tension and compression on the strain gauge elements 118 depending on the specific location of the strain gauge elements 118 mounted on the top surface 142 and bottom surface 144 of the flexible substrate 112. For some embodiments, the output signals of the strain gauges 108 of the strain gauge assembly 104 generated by the twisting or torsion strain mode illustrated in FIG. 19B may be carried out with a bridge circuit 164 as shown in FIG. 20. The circuit 164 in FIG. 20 includes a representation of four strain gauges 108 indicated by reference numbers J1, J2, J6 and J5 that may be disposed on the flexible substrate 112 as shown in FIGS. 22A and 22B. For some embodiments, the output signals of the strain gauges 108 of the strain gauge assembly 104 generated by the bending strain mode illustrated in FIG. 18B may be carried out with a bridge circuit 166 as shown in FIG. 21. The circuit 166 in FIG. 21 includes a representation of four strain gauges 108 indicated by reference numbers J4, J7, J3 and J8 that may be disposed on the flexible substrate 112 also as shown in FIGS. 22A and 22B. Regarding circuits 164 and 166 of FIGS. 20 and 21 respectively, contact point Vcc corresponds or is connected to terminal 130 of FIG. 22A, the ground line corresponds or is connected to terminal 131, terminal M1 corresponds or is connected to terminal 132, terminal M2 corresponds or is connected to terminal 133, M3 corresponds or is connected to terminal 134 and M4 corresponds or is connected to terminal 135.

For some embodiments, the controller 44' may be configured to be coupled to another processing or computing device, such as a personal computer that may include a processor, a memory device, and a keyboard for data input and a screen for visual display. In some instances, the controller 44' may include a USB port or similar data port for communicating with such a secondary processing device and the secondary processing device used to communicate with the controller and display position data on a screen thereof. The secondary computing device may also be used to store position data for one or more positions of the second mount body 48' relative to the first mount body 52'. For some embodiments of the mount 100, the first mount body may have a range of movement or displacement of about 0.5 degrees to about 10 degrees in each of the first and second axes of direction, which may be substantially perpendicular to each other. More specifically, some embodiments may have a range of motion in each axis of direction of about 1 degree to about 5 degrees.

With regard to the above detailed description, like reference numerals used therein may refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

The entirety of each patent, patent application, publication and document referenced herein is hereby incorporated by reference. Citation of the above patents, patent applications, publications and documents is not an admission that any of the foregoing is pertinent prior art, nor does it constitute any admission as to the contents or date of these documents.

Modifications may be made to the foregoing embodiments without departing from the basic aspects of the technology. Although the technology may have been described in substantial detail with reference to one or more specific embodiments, changes may be made to the embodiments specifically disclosed in this application, yet these modifications and improvements are within the scope and spirit of the technology. The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" may refer to one of or a plurality of the elements it modifies (e.g., "a reagent" can mean one or more reagents) unless it is contextually clear either one of the elements or more than one of the elements is described. Although the present technology has been specifically disclosed by representative embodiments and optional features, modification and variation of the concepts herein disclosed may be made, and such modifications and variations may be considered within the scope of this technology.

Certain embodiments of the technology are set forth in the claim(s) that follow(s).

What is claimed is:

1. An adjustable mount for an optical element, comprising:
a first mount body;
a second mount body which is configured to secure an optical element thereto and which is movable relative to the first mount body in an adjustable degree of freedom;
a flexible substrate including a first portion secured to the first mount body and a second portion secured to the second mount body; and
a strain gauge element mechanically secured to the flexible substrate and configured to register strain of the flexible substrate and generate a signal in response to a strain of the flexible substrate.

2. The adjustable mount of claim 1, further comprising a driver configured to controllably impart relative movement in the adjustable degree of freedom between the first mount body and the second mount body.

3. The adjustable mount of claim 1, further comprising a controller in operative communication with the stain gauge element and configured to generate position data from the strain gauge element signal.

4. The adjustable mount of claim 1, wherein two or more strain gauge elements are mechanically secured to the flexible substrate.

5. The adjustable mount of claim 1, wherein the strain gauge element is disposed on a resistive strain gauge body of a strain gauge, the strain gauge body being mechanically secured to the flexible substrate.

6. The adjustable mount of claim 5, wherein the strain gauge element includes an electrical circuit which is configured to change electrical impedance in response to strain imposed on a conductive element of the strain gauge.

7. The adjustable mount of claim 1, wherein the flexible substrate comprises a thin flexible sheet including two substantially parallel surfaces and an aperture disposed through a middle portion of the sheet.

8. The adjustable mount of claim 7, wherein the flexible substrate comprises a flat square plate with an aperture in the middle producing a perimeter region having four sides and four corners with the first portion disposed at a first corner and the second portion disposed at a second corner, the second corner disposed opposite the aperture from the first corner.

9. The adjustable mount of claim 2, wherein the driver is manually driven.

10. The adjustable mount of claim 2, wherein the driver is motorized.

11. The adjustable mount of claim 10, wherein the motorized driver comprises a piezoelectric driver.

* * * * *

UNITED STATES PATENT AND TRADEMARK OFFICE
CERTIFICATE OF CORRECTION

PATENT NO. : 8,755,133 B2 Page 1 of 1
APPLICATION NO. : 13/914182
DATED : June 17, 2014
INVENTOR(S) : Patrick J. Thomas, Daniel Gvero and Roger Desailly It is certified that error appears in the above-identified patent and that said Letters Patent is hereby corrected as shown below:

In the Claims

Column 21
    Claim 3, line 21 should read:
        "controller in operative communication with the strain guage".

Signed and Sealed this
Second Day of June, 2015

Michelle K. Lee
*Director of the United States Patent and Trademark Office*